(12) United States Patent
Miki et al.

(10) Patent No.: US 6,476,731 B1
(45) Date of Patent: Nov. 5, 2002

(54) DRIVING SUPPORT DEVICE

(75) Inventors: Nobuaki Miki, Kariya (JP); Hiroshi Ishigaki, Aichi-ken (JP); Seiji Sakakibara, Chiryu (JP)

(73) Assignee: Aisin Aw Co., Ltd. (JP)

( * ) Notice: Subject to any disclaimer, the term of this patent is extended or adjusted under 35 U.S.C. 154(b) by 0 days.

(21) Appl. No.: 09/601,247

(22) PCT Filed: Dec. 3, 1999

(86) PCT No.: PCT/JP99/06790

§ 371 (c)(1),
(2), (4) Date: Sep. 21, 2000

(87) PCT Pub. No.: WO00/33279

PCT Pub. Date: Jun. 8, 2000

(30) Foreign Application Priority Data

Dec. 3, 1998 (JP) .......................................... 10-361908

(51) Int. Cl.⁷ .............................................. G08G 1/017
(52) U.S. Cl. ........................ 340/937; 340/435; 340/436; 340/935
(58) Field of Search ................................ 340/435, 436, 340/903, 904, 901, 988, 990, 461; 701/25, 41, 70, 72; 348/116, 118, 148

(56) References Cited

U.S. PATENT DOCUMENTS

| | | | | | |
|---|---|---|---|---|---|
| 5,377,106 | A | * | 12/1994 | Drunk et al. ................. | 180/169 |
| 5,530,420 | A | * | 6/1996 | Tsuchiya et al. ............. | 340/435 |
| 6,151,539 | A | * | 11/2000 | Bergholz et al. ............. | 340/435 |
| 6,170,591 | B1 | * | 1/2001 | Sakai et al. .................. | 180/204 |
| 6,222,447 | B1 | * | 4/2001 | Schofield et al. ........... | 340/436 |
| 6,268,803 | B1 | * | 7/2001 | Gunderson et al. ......... | 340/903 |

* cited by examiner

Primary Examiner—Van Trieu
(74) Attorney, Agent, or Firm—Lorusso & Loud

(57) ABSTRACT

The invention makes it possible to acquire the dead angle (dead spot) information as images properly related to the field of view of a driver by an arrangement of image pickup units. There is provided a driver assist system including one or more image pickup units, a control unit for processing the taken picture, and a monitor for displaying the processed picture. The image pickup unit is so disposed over a corner of the vehicle by directing its optical axis in such a direction that the corner of the vehicle, an external field at least in the vicinity of the corner and infinity may be seen in one display screen.

28 Claims, 29 Drawing Sheets

FIG.17
(1)
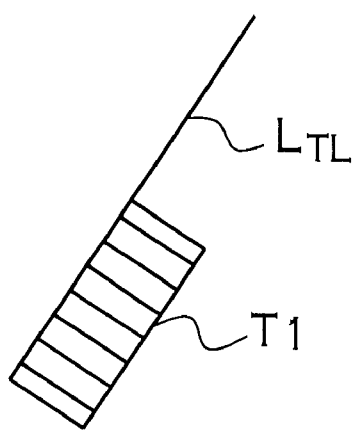
(2)
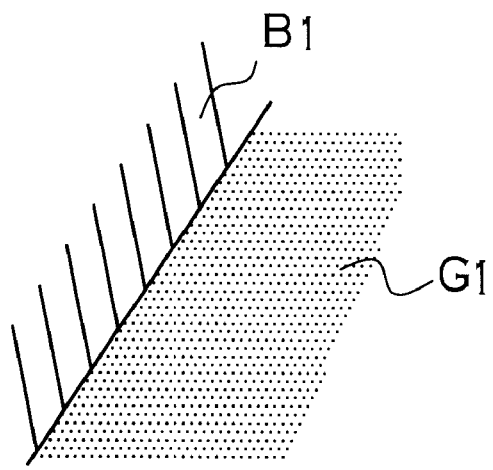

FIG.29
② parking operation start
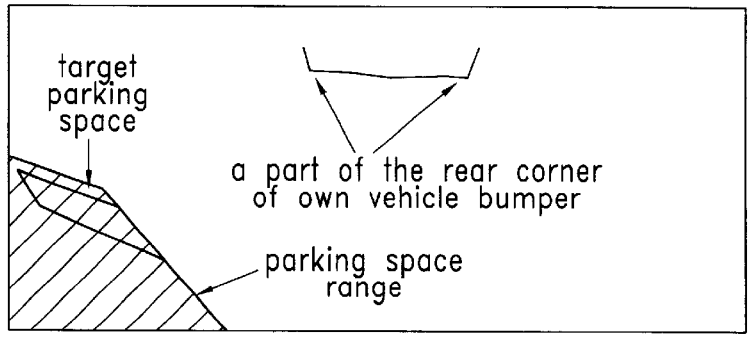
③ while parking operation 1
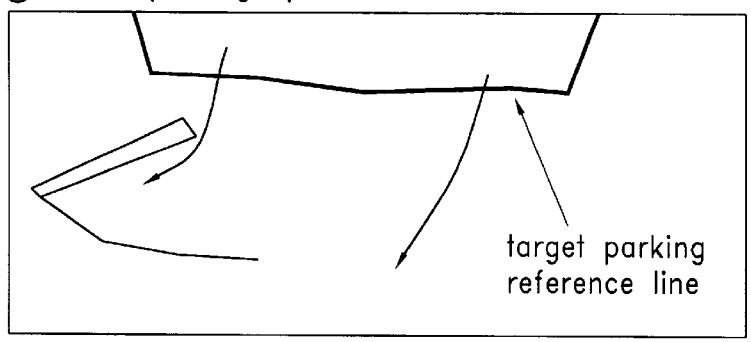
③ while parking operation 2
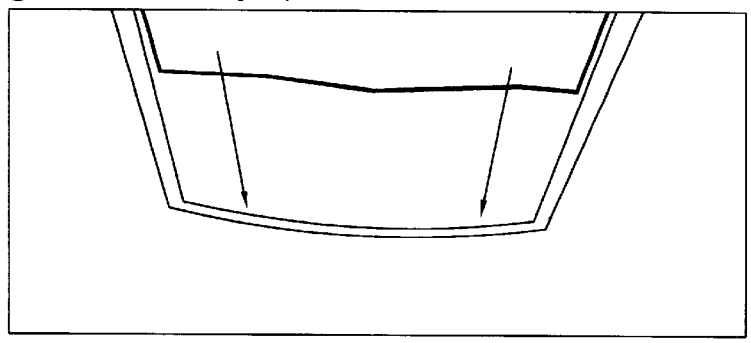
④ parking operation end
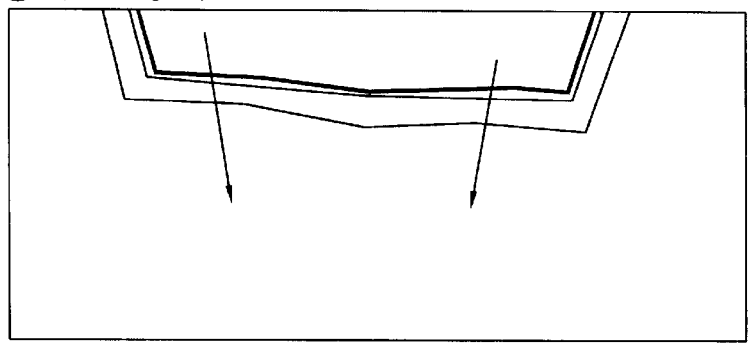

FIG.33
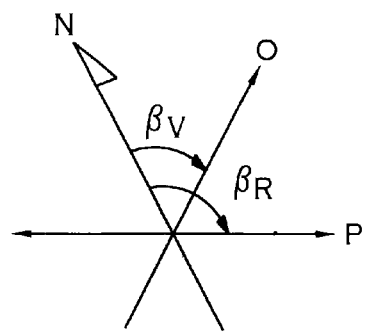
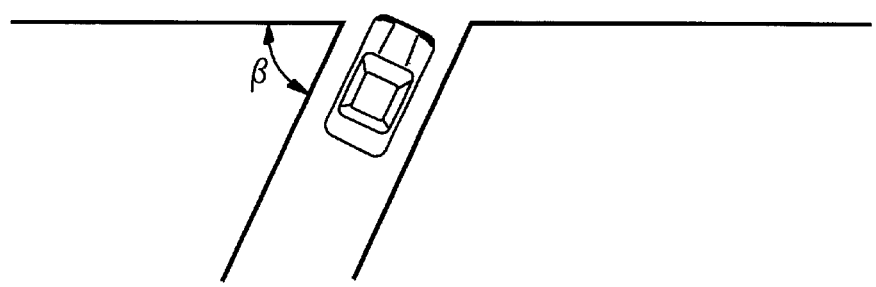
FIG.34
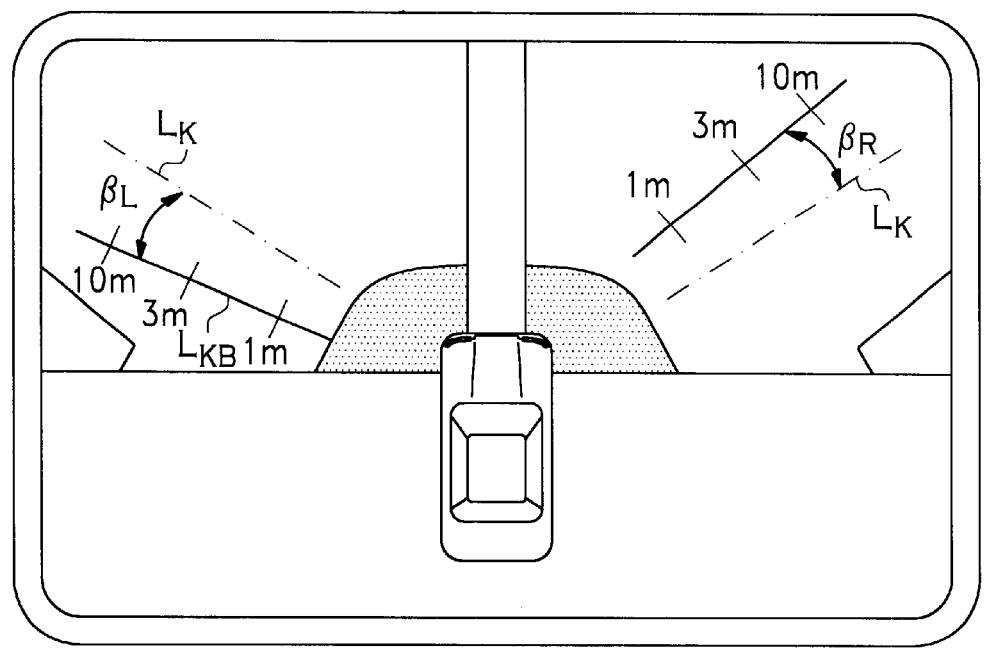

DRIVING SUPPORT DEVICE

CROSS-REFERENCE TO RELATED APPLICATIONS

The present application is the national stage under 35 U.S.C. 371 of PCT/JP99/06790, filed on Dec. 3, 1999, and foreign application of Japan H10-361908 filed on Dec. 3, 1998.

BACKGROUND OF THE INVENTION

1. Field of the Invention

The present invention relates to an assist system for complementing the field of view of a driver by providing information on the environment of a vehicle or a dead angle (spot) in the driver's view by display of a picture on an internal monitor with superimposing of the assisting information, if necessary, for the driving operation.

2. Description of the Related Art

An automobile has a body which entirely surrounds the driver so that the driver cannot be free from a dead spot in his field of view which is shielded by the portions of the automobile body other than the windows. This dead spot or dead angle should be eliminated for avoiding a low obstacle on a narrow road or a moving obstacle. In order to indirectly acquire information on such dead spot, therefore, the vehicle has been equipped in the related art with dead angle eliminating means, as represented by an under-mirror of a large-sized vehicle. In view of the higher performance and the smaller size of display units in recent years, there have been proposed a variety of devices utilizing the display unit. Of these proposals, an especially wide dead angle range is effectively covered by the technique which has been disclosed in Japanese Patent Laid-Open No. 142210/1997. This related art includes an image pickup unit for taking an image of the environment, and a monitor for displaying the picture taken by the image pickup unit. The image pickup is mounted on the upper central portion of the back of the vehicle as to provide a view from the region just behind the vehicle to the region horizontally outward from the vehicle on one screen. In the picture taken in this case, a portion (e.g., bumper) of the rear end portion of the vehicle is positioned at a lower portion of the screen, and infinity (or a horizontal line) is shown at an upper portion of the screen.

According to the aforementioned method of the related art in which the image pickup unit is disposed generally at the center of the vehicle, however, the image pickup unit cannot be positioned as high in a vehicle having a small height such as a passenger automobile as in a large-sized vehicle. At a corner of the vehicle, most important for avoiding an obstacle, the angle between a vertical line drawn from the corner outer edge of the bumper to the ground and a straight line joining the image pickup unit at an upper portion of the center of the vehicle and the corner outer edge of the bumper becomes so large that the picture thus obtained has the obstacle superimposed over a background of the corner of the bumper. This makes it difficult to sense the distance between the vehicle corner and the obstacle. Further, because of the large angle, a dead angle is left in the vicinity of the bumper corner so that a low obstacle nearby cannot be seen.

In order to reduce the distortion of the picture and thereby provide a proper sense of distance, it is conceivable to provide a combination of the dedicated various drive assisting systems of the related art, for a specific driving operation, to cover the dead angles individually by individual image pickup units arranged at different positions on the vehicle, so that the information from those individual units, as required for the vehicle operations, can be acquired by selecting them properly at the same time or as necessary. Generally, however, the information by the monitor screen is not such that it is easy to grasp at a glance and at a high speed which direction of the vehicle the screen corresponds to or which position it is taken from. When the behavior of the vehicle, i.e., the driving operation, and the change in the picture are independent, the information on the screen cannot be effectively exploited, even if acquired, in difficult driving operations.

SUMMARY OF THE INVENTION

Accordingly, the invention has, as its main object, provision of a drive assisting system for acquiring dead angle information, from which the distance can be easily determined, while covering a relatively wide area by displaying a picture providing an unobstructed field of view for the driver.

In order to achieve the above-specified object, according to the invention, there is provided a drive assisting system comprising an image pickup unit disposed on a vehicle for viewing the area in the vicinity of the vehicle, wherein the image pickup unit is oriented longitudinally inclined with respect to a reference position, wherein the upper side of the field of view is directed forward of the vehicle and where the optical axis is directed vertically downward, to obtain an image including at least the edge portion of the vehicle and an area in the front/rear of the vehicle.

In another aspect, the invention provides a drive assisting system comprising an image pickup unit disposed on a vehicle for viewing the area in the vicinity of the vehicle, wherein the image pickup unit is oriented transversely inclined with respect to a reference position, wherein the upper side of the field of view is directed forward of the vehicle and wherein the optical axis is directed vertically downward, to obtain an image including at least the edge portion of the vehicle and an area to the left or right of the vehicle.

According to the invention, moreover, there is provided a driver assist system comprising an image pickup unit disposed on a vehicle for viewing the area in the vicinity, wherein the image pickup unit is oriented longitudinally or transversely inclined with respect to a reference position, where the upper side of the field of view is directed forward of the vehicle and where the optical axis is directed vertically downward, to obtain an image including at least the edge portion of the vehicle, in accordance with the front/back or left/right position on the vehicle.

In order to provide a sense of the image matching the driver's view, it is advantageous to dispose the image pickup unit with its optical axis directed in substantially the same direction as a vertical plane containing a straight line joining the driver and the image pickup unit. As a result, it is possible to acquire a monitor picture in which the direction in the picture is substantially aligned with the direction of view of the image pickup unit from the driver's seat.

In order to facilitate a sense of orientation of the two corners of the vehicle and the direction of the vehicle on the picture, it is advantageous that the image be rotated on the optical axis so that the corner of the vehicle in the image properly relates to the corner on the opposite side.

According to the invention, there is also provided a driver assist system comprising an image pickup unit disposed on a vehicle for providing information in the form of images of the environment of the vehicle; a control unit for processing the image taken by the image pickup unit; and a monitor for displaying the image processed by the control unit, wherein the image pickup unit is so disposed over a corner of the vehicle that its optical axis is directed in a direction to view the corner of the vehicle, the environment at least in the vicinity of the corner and infinity on one display screen.

It is advantageous that the infinity is displayed across the entire transverse width of the monitor screen. Because infinity is displayed across the entire transverse width of the monitor, the field of view in the picture is made to resemble the actual field of view from the driver's seat.

To make the taken picture resemble the driver's field of view, it is advantageous that the infinity contains the front face of the vehicle; and that the front face infinity is displayed over the corner of the vehicle on the monitor. Because the displayed infinity contains the front face of the vehicle, the direction of the vehicle at each instant can be more easily understood, along with its positional relationship.

It is also advantageous that the left and right images be inclined transversely opposite on the optical axes. Because the taken picture is displayed without any special processing on the monitor, the image of the corner of the vehicle can be displayed at the corresponding corner of the monitor screen so that the left/right sides of the vehicle can be easily differentiated.

To make the images resemble the driver's actual field of view, moreover, it is advantageous that the image pickup unit is disposed at a position where the front face infinity of the vehicle is horizontal in the display on the monitor. Because the front face of the vehicle is shown horizontal at infinity in the display on the monitor, the similarity between the actual field of view from the driver's seat and the field of view in the monitor display is enhanced.

In order to assist various driving operations, it is advantageous that the image pickup units be disposed at the two left and two right corners of the vehicle, so as to eliminate the dead angles (spots) at the left/right corners of the vehicle.

When transverse symmetry is necessary for the taken picture, it is advantageous that the image pickup unit at one of the left and right corners of the vehicle, be disposed with its optical axis directed in substantially the same direction as that of a vertical plane containing a straight line joining the driver and the image pickup unit, whereas the image pickup unit at the other left/right corner is disposed at a position symmetric therewith relative to the longitudinal center axis of the vehicle.

To provide a further drive assist, the control unit may include predicted locus synthesizing means for superimposing a movement predicted locus, extending from the corner of the outermost edge of the vehicle according to a steering angle, over the picture display on the monitor. As a result, it is possible to predict on the monitor display whether or not the obstacle can be avoided. Therefore, it is possible to perform a smooth operation without the switchbacks frequently required for obstacle avoidance with such assist. The predicted locus is synthesized according to whether the range selected in the transmission of the vehicle is forward or reverse.

In order that the assist information correspond to the driving operation and the road situations, the control unit may advantageously include display picture switching means for automatically switching the display screen by deciding forward or reverse based on the selected range and by deciding necessity based on at least one of the steering angle and road information obtained from a navigation system. As a result, it is possible for the driver to acquire the assisting information without imposition of any operational load on the driver.

In the interest of safety, it is advantageous that the control unit includes display picture selecting means for automatically displaying the pictures taken by the image pickup units, disposed at the two vehicle corners having a tendency to approach an obstacle, on the monitor within a range where the distance of the obstacle to the vehicle is no more than a predetermined value.

In the interest of preventing confusion from the assist information, it is effective that the control unit includes release means for releasing the automatic display switching of the screen when the answer of the necessity decision is NO.

In order to facilitate a sense of distance by reducing distortion of the picture, it is advantageous that the control unit includes criterion distance synthesizing means for superimposing a criterion distance line, indicating spatial distance from the two vehicle corners on the monitor display in accordance with the picture displayed on the monitor.

In order to make the picture more observable, it is advantageous that the control unit includes contour synthesizing means for superimposing the contour of the vehicle on the monitor in accordance with the picture displayed on the monitor. As a result, even when the contrast or brightness of the monitor screen is reduced by an insufficiency of light or reflection of light, according to the weather conditions, so that the discrimination between the vehicle and its surroundings becomes difficult, the boundary between the vehicle and its surroundings can be made more clear by synthesizing the contour lines to make the two contours of the vehicle observable on the screen.

To compensate for the loss of information due to the focusing (selection) of the assist information, it is advantageous that the control unit includes warning means for notifying the driver of auxiliary information which is not contained in the information of the picture displayed on the monitor. Such notification of loss of information caused by focusing the assist information may be made automatically.

Depending upon whether the image pickup unit is disposed on the front or rear of the vehicle, the direction of the view relative to the vehicle is inverted upside-down in the taken picture, so that the picture conforming to the actual longitudinal field of view can be taken by displaying the taken picture of the image pickup unit as is without any special processing.

In accordance with whether the image pickup unit is disposed on the left side or the right side of the vehicle, the direction of the view relative to the vehicle conforms to the actual transverse field of view with display of the taken picture as is without any special processing on the monitor.

The image pickup units disposed on the front/rear sides or on the left/right sides of the vehicle, provide a view looking in a direction relative to the vehicle which is inverted upside-down in the longitudinal direction and which conforms to viewing in the transverse direction in the taken picture, so that a picture conforming to the actual longitudinal/transverse field of view can be presented as is, without any special processing on the monitor.

By disposing the image pickup unit at a position where its optical axis is directed in substantially the same direction as that of a vertical plane containing a straight line joining the driver and the image pickup unit, it is possible to provide a picture which corresponds to (is generally aligned with) the gazing direction as viewed from the driver's seat.

When the taken picture is displayed without any special processing on the monitor, the image of the corner of the vehicle can be displayed at the proper corner of the screen so that distinction between the left and right sides of the vehicle can be facilitated in viewing of the displayed picture.

The image pickup unit is disposed over the corner of the vehicle so that the angle between a vertical line drawn from the outermost edge of the vehicle corner to the ground and a straight line joining the image pickup unit and the outermost edge of the corner of the vehicle is very acute. In all the peripheral situations of the vehicle, it is possible to acquire a picture in which the ground surface is in accordance with the distance between the vehicle corner and an obstacle. This makes it possible to confirm the distance between the obstacle and the vehicle, i.e., its corner. On the other hand, the vehicle corner and its vicinity are displayed, as necessary dead angle information for avoiding collision, on one screen simultaneously with infinity, for effectively communicating the positional relationship at a glance. As a result, the positional relationship on the screen is similar to that in the view of the environment from the driver's seat.

BRIEF DESCRIPTION OF THE DRAWINGS

FIG. 17 is a picture diagram of a line display in contrast;

FIG. 29 is an explanatory diagram showing actual screen changes in the parking operation;

FIG. 33 is a sketch illustrating an intersection which is the subject of the blind cornering display;

FIG. 34 shows another monitor display screen in blind cornering;

DESCRIPTION OF THE PREFERRED EMBODIMENTS

Figure 2:
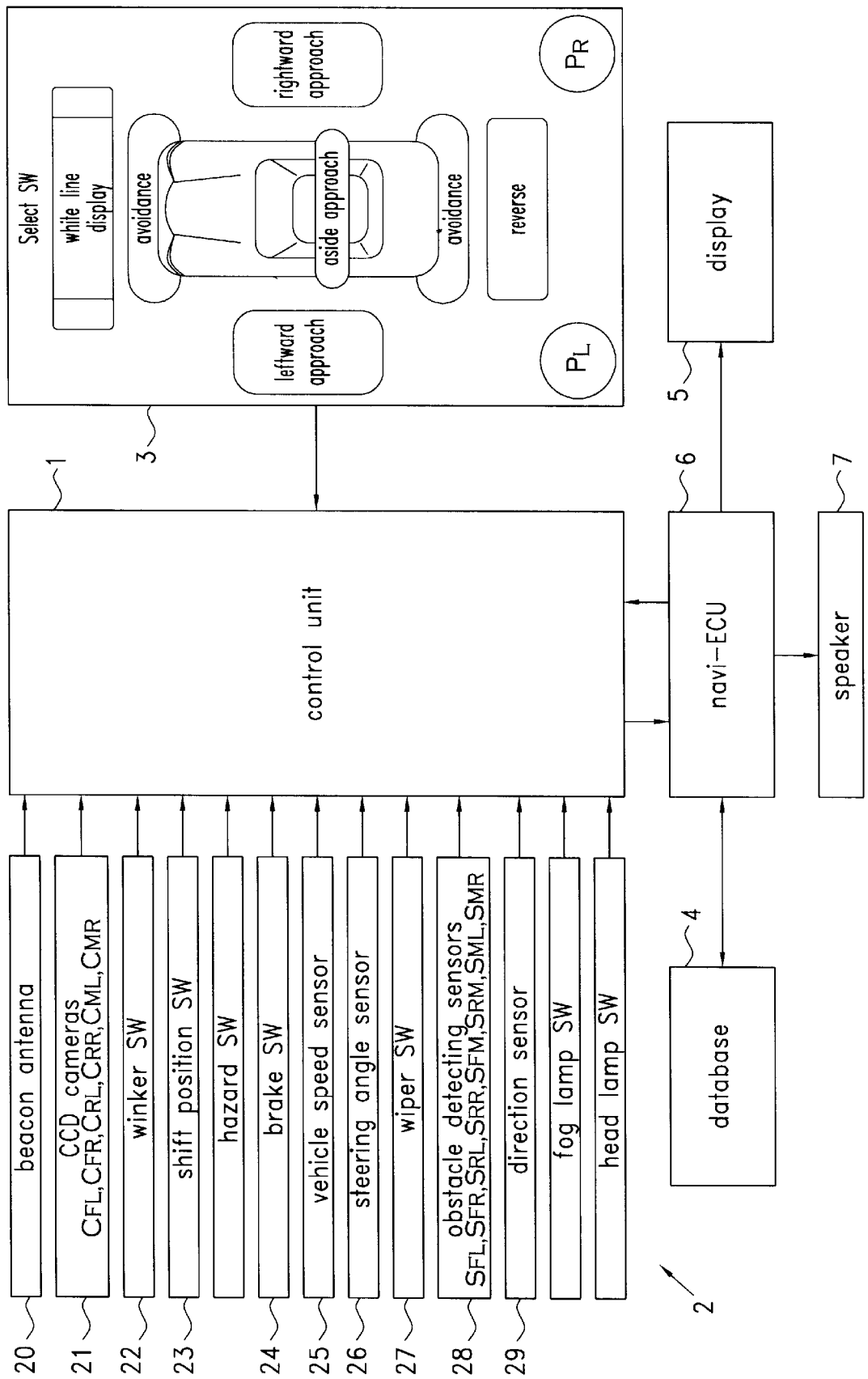
FIG. 2 is a block diagram of the drive assisting system of the invention.

An embodiment of the invention will be described in the following with reference to the accompanying drawings. FIG. 2 shows an embodiment of a drive assisting system according to the present invention in block form. This system includes: a control unit 1 stored with programs for processing pictures; an input unit 2 for retrieving a variety of information necessary for the controls; and a select switch 3 for suitably selecting the information necessary for the driver's driving operations. In order to exchange the information with a navigation system, the system is connected with a nagi-ECU 6 of the navigation system which includes a database 4, a display 5 and a speaker 7. In this embodiment, therefore, the display 5 is utilized as a monitor for the information display of this system, and the speaker 7 is utilized for audio information. Here, the shown select switch 3 may be dedicated to this system but may, in the alternative, be either a touch panel of the display 5 of the navigation system or a voice recognition unit.

Figure 3:
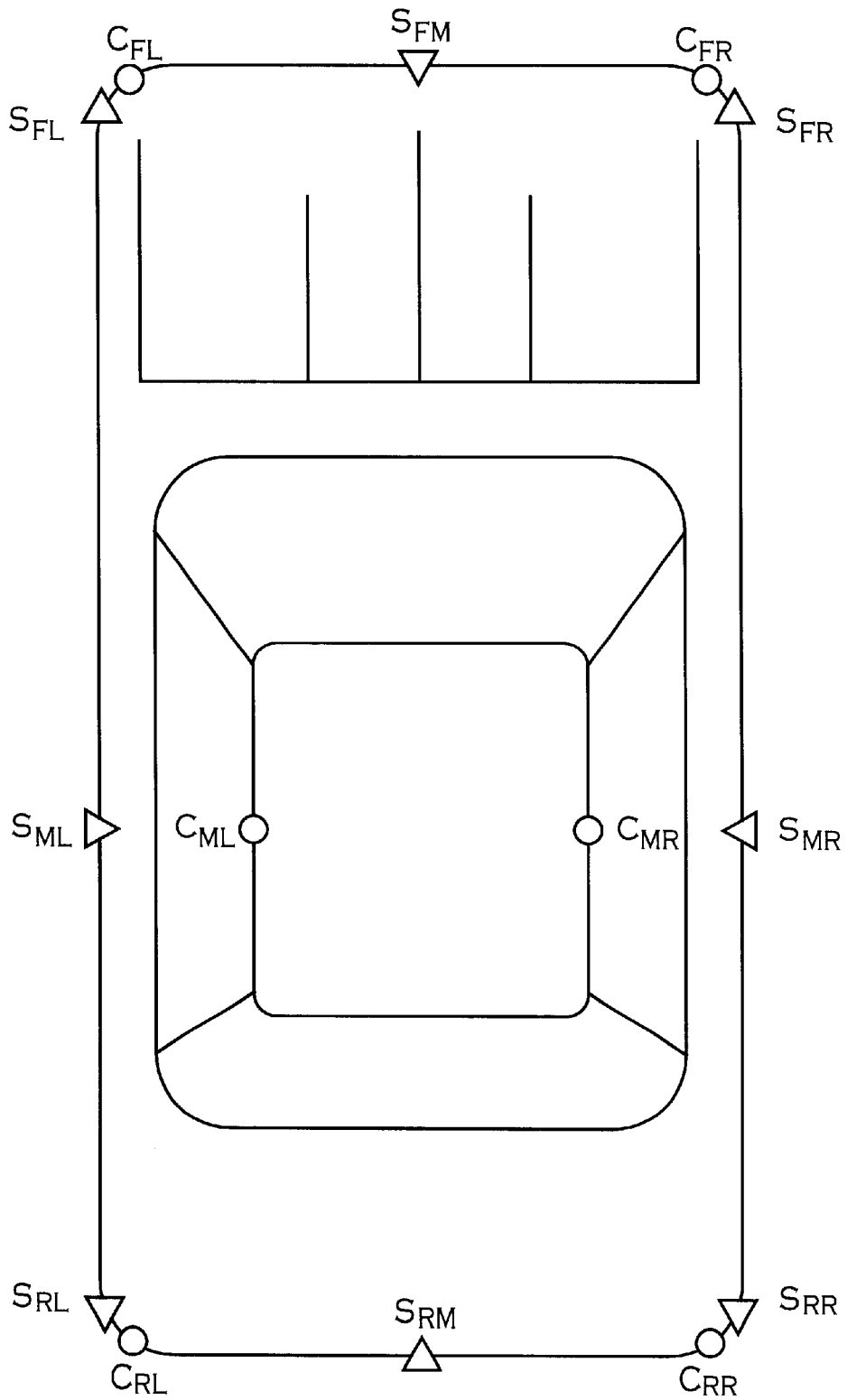
FIG. 3 is a top plan view of a vehicle schematically showing the arrangement of the image pickup units and distance detecting units of the drive assisting system of the invention.

Image pickup units composing the input unit, as shown in FIG. 3, are disposed at the four corners and at the left and right centers of a vehicle, in the form of CCD cameras 21, as indicated by circle symbols (the "cameras" are differentiated by abbreviations indicating locations, i.e., $C_{FL}$, $C_{FR}$, $C_{RL}$, $C_{RR}$, $C_{ML}$ and $C_{MR}$). As also shown in FIG. 3, detecting sensors 28 are located at positions close to the cameras 21 and also at the centers of the front and back ends of the vehicle. The detecting sensors 28, which serve as distance detecting units, are indicated by triangle symbols, (also distinguished by abbreviations $S_{FL}$, $S_{FR}$, $S_{RL}$, $S_{RR}$, $S_{ML}$, $S_{MR}$, $S_{FM}$ and $S_{RM}$). These distance detecting units 28 may be either a known device for detecting the distance directly, such as an ultrasonic sensor, a laser or a milli-wave radar, or arithmetic means for determining the distance indirectly by processing of the pictures taken by the plurality of cameras 21 in the control unit 1.

An object of the invention is to provide graphic information necessary for a variety of driving operations in a manner coinciding with the visual senses of the driver in the driver's seat. This objective dictates the mounting of the cameras 21, specifically their setting positions and locations, and the method and timing for displaying the pictures by the control unit.

Figure 1:
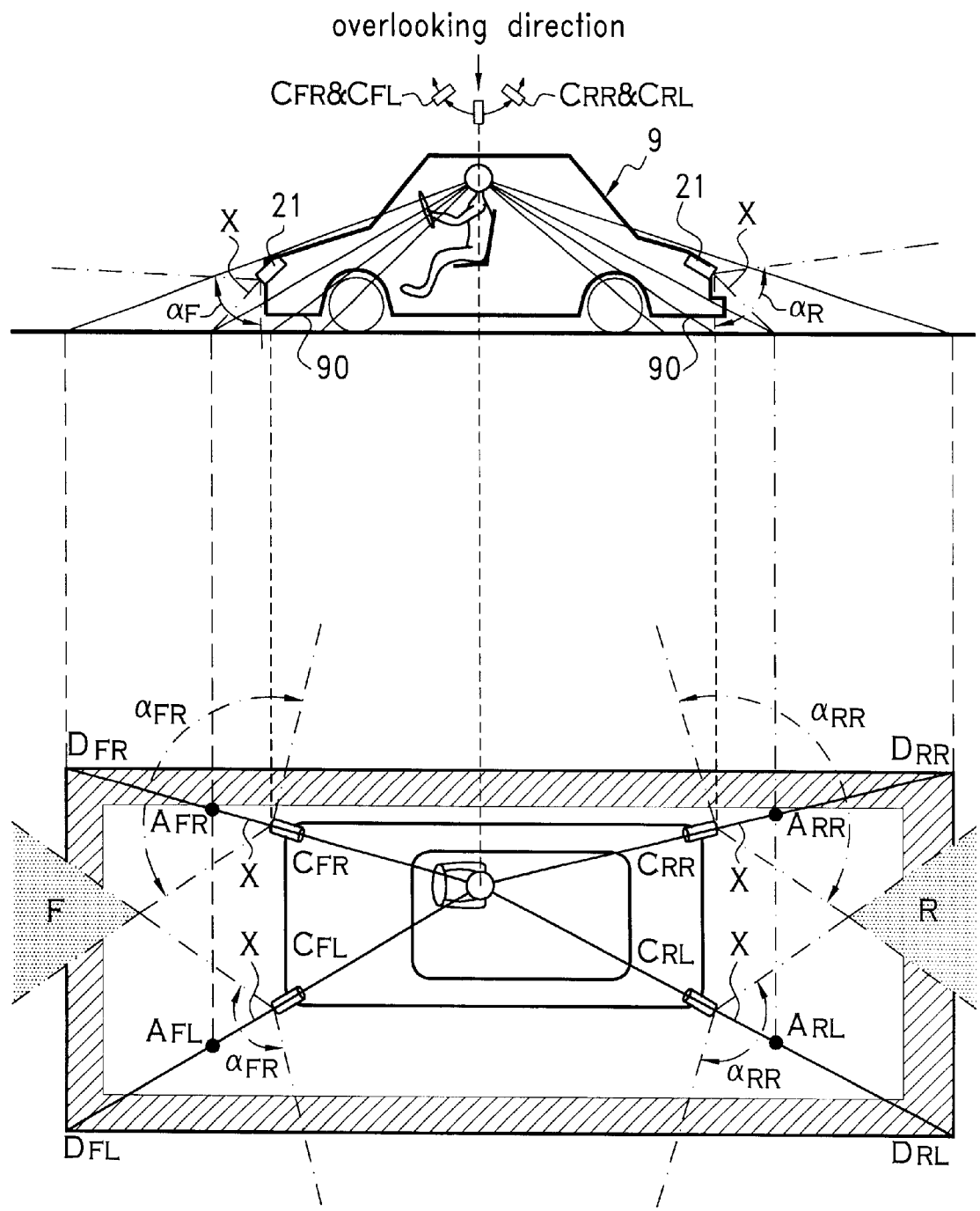
FIG. 1 is an explanatory diagram showing positioning of image pickup units in one embodiment of a drive assisting system of the invention.

As shown in FIG. 1, the dead angle range which the seated driver cannot physically observe is a hatched area defined by points $D_{FL}$, $D_{FR}$, $D_{RR}$ and $D_{RL}$. However, the blind spots, shielded from view by the door frames and the pillars supporting the roof, are omitted. In order to cover the blind spots and to provide the picture information to match the senses of the driver, according to a first arrangement, each camera 21 is oriented in a direction longitudinally or transversely inclined with respect to a reference position, where the upper side of the taken picture is directed forward of the vehicle and where the optical axis is directed vertically downward, for taking at least the edge portion of the vehicle, that is, the front/rear end portion in the longitudinal direction or the left/right side end portion in the transverse direction, in accordance with the position where the camera is disposed on the vehicle.

Figure 4:
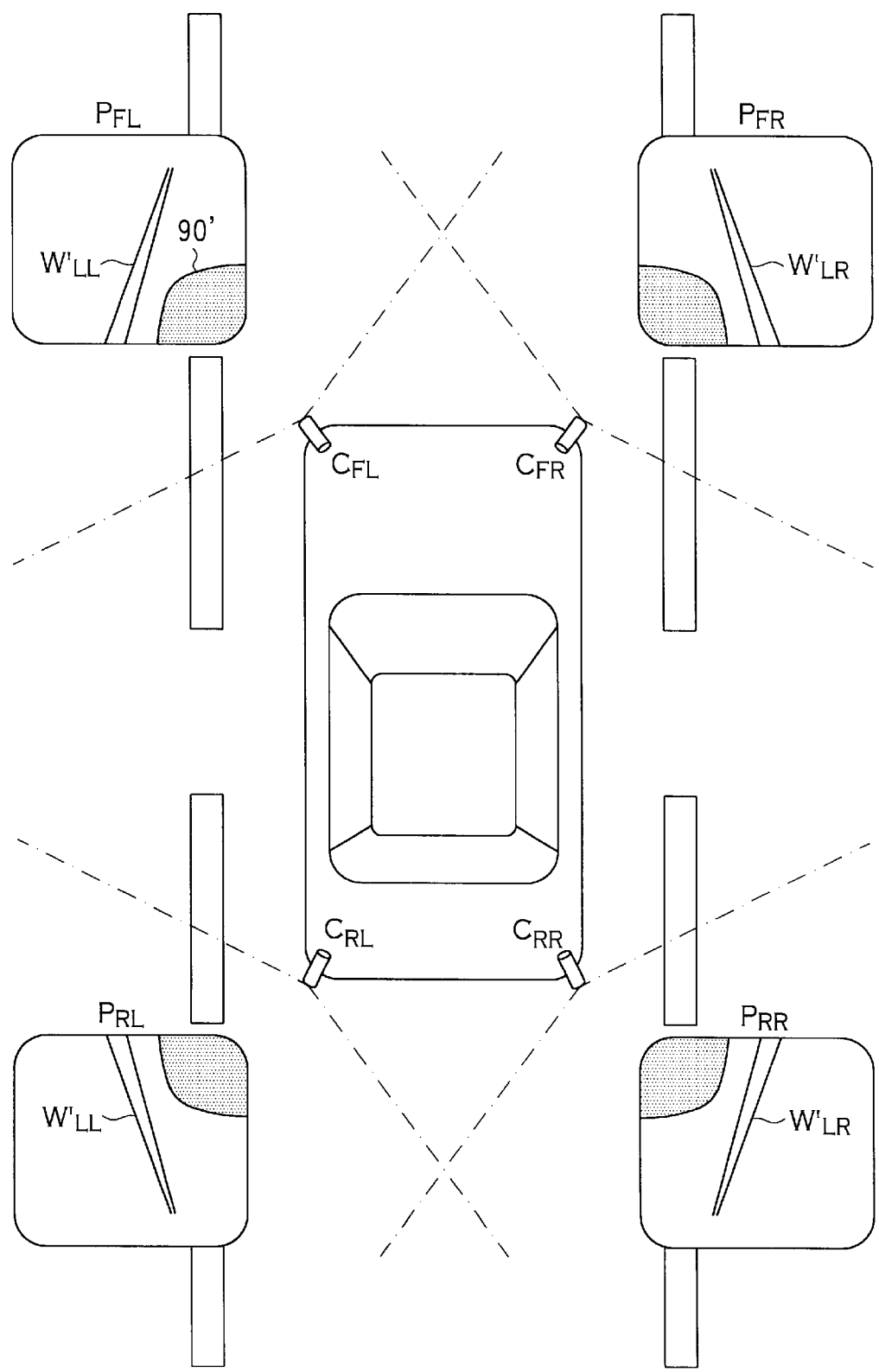
FIG. 4 is an explanatory diagram showing the relationship between the orientations of the image pickup units, disposed at each corner of the vehicle, and a monitor display screen.

In accordance with this concept, each camera 21 which is located at a corner of the vehicle, is oriented in a direction to simultaneously view the corner of the vehicle itself or the vehicular edge portion corresponding to its location, the vehicular periphery including the vicinity of the viewed corner, and background at an infinite distance. Especially in automobiles of recent vintage, the corner of the vehicle is not always definite because it is rounded for sake of design. Accordingly, the vehicle corner is defined in the invention to mean the edge, as the vehicle is viewed in a top plan view, i.e., the outermost edge and its vicinity. In the case of the corner of a bumper, for example, if the bumper is rounded the vehicle corner is estimated by extension of the front and side edges or the rear and side edges of the bumper or by extension of the rear and side edges of the vehicle. The manner in which the camera pictures the individual corners is exemplified in FIG. 4 by $P_{FL}$, $P_{FR}$, $P_{RL}$ and $P_{RR}$ and, therefore, the positions of the individual cameras $C_{FL}$, $C_{FR}$, $C_{RL}$ and $C_{RR}$ are so set that the pictures cover an area shaped by extensions of the front and back ends and the left and right sides of the vehicle body, respectively. In FIG. 4: $W_{LL}$ and $W_{LR}$ indicate white lines of a road surface; $W'_{LL}$ and $W'_{LR}$ indicate white lines in the camera picture; and numeral 90' designates a bumper as the vehicle corner in the picture. As will be detailed hereinafter, a camera 21 is generally located at each necessary location on the vehicle body and at a position as high as possible as to retain a wide field of view.

According to a second arrangement, the camera 21 is oriented, as shown in FIG. 1, in a direction substantially aligned with the direction of the line of sight of the seated driver looking in the same direction. That is, the camera is disposed at such a position that its optical axis X is oriented substantially within a vertical plane containing a straight line joining the driver and the camera 21. The optical axis X intersects the ground at points $A_{FL}$, $A_{FR}$, $A_{RL}$ and $A_{RR}$, as shown. As a result, the vertical field angle ranges covered by the individual cameras 21 are indicated by $\alpha_F$ and $\alpha_R$, and the transverse field angle ranges are indicated by $\alpha_{FL}$, $\alpha_{FR}$, $\alpha_{RL}$ and $\alpha_{RR}$. Strictly speaking, the direction of the aforementioned straight line joining the driver and the camera 21 depends on the slide position of the seat and the reclining inclination selected by the driver, so that the direction of the vertical plane containing the aforementioned straight line also changes. However, the direction substantially in the direction of the vertical plane, as defined herein, may be within a range allowing shift in the position of the driver or the directional shift accompanying the change in position. The direction may be set by a method accounting for changes in the driver's position, for example, by indexing the standard position statistically while considering all those factors.

If the camera 21 is disposed such that the transverse axis on its picture is horizontal, moreover, the bumper corner 90' of the vehicle is positioned below the center of the screen, as shown in FIG. 4, by the camera $C_{FL}$, for example, so that the white line $W_{LL}$ of the road surface parallel to the vehicle appears as an image crossing the screen diagonally in the direction from the left lower portion (or the right lower portion) to the right upper portion (or the left upper portion).

In a third arrangement for disposition of the camera, the camera 21 is disposed at a position inclined on its optical axis X. For the camera on the left side of the vehicle, for example, the clockwise inclination is added by turning the camera clockwise on the optical axis. As a result, the screen is oriented such that the forward direction matches the driver's senses, as shown in FIG. 4. Specifically, a picture $P_{FL}$ is the image of the camera $C_{FL}$ disposed at the left front corner and includes the left front corner 90' at the right lower corner such that the straight white line $W'_{LL}$ ahead is shown extending obliquely rightward and upward from the lower center of the screen as to match the angle, at which the white line $W_{LL}$ on the left side of the vehicle is actually viewed from the driver's seat, in a perspective view. When the front left picture $P_{FL}$ and the front right picture $P_{FR}$ are simultaneously arranged on the left and right of the screen, moreover, this picture presents an arrangement in which the white line $W'_{LL}$ to the left of the vehicle on the picture $P_{FL}$ and the white line $W'_{LR}$ to the right of the vehicle on the picture $P_{FR}$ intersect at infinity as if a front view was taken by one camera. This inclination given to the screen is similar on the right front side and on the rear left and right sides.

Figure 5:
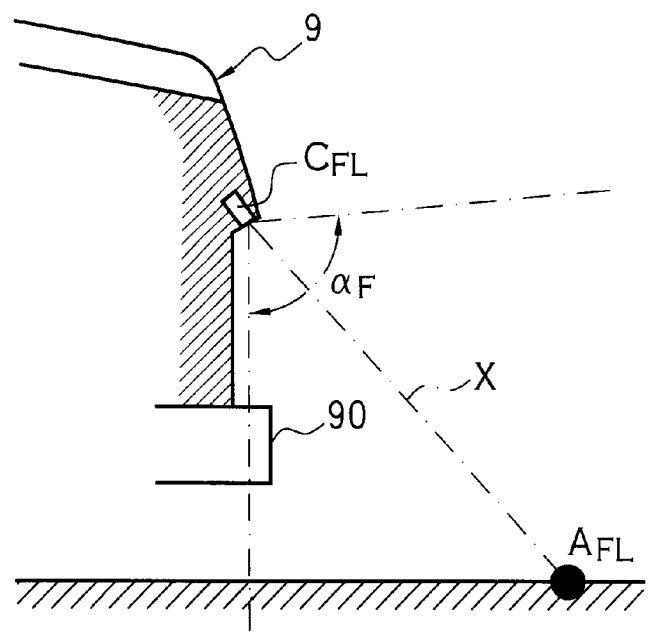
FIG. 5 is a sectional view schematically illustrating the specific arrangement and orientation of an image pickup unit at a vehicle corner in one embodiment of the invention.
Figure 6:
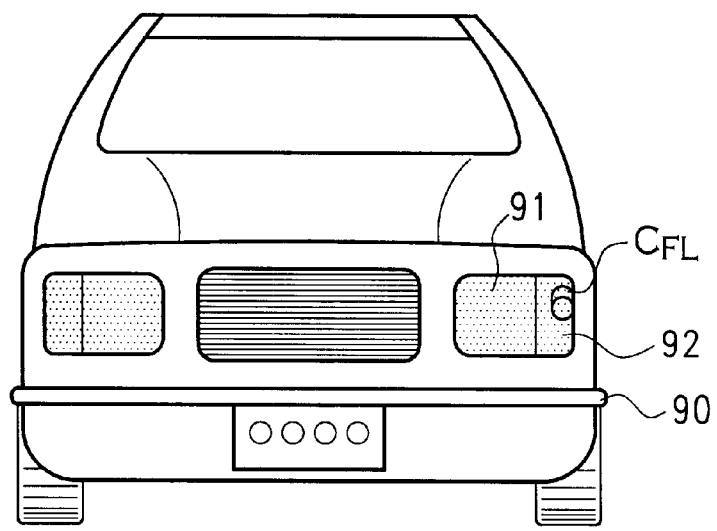
FIG. 6 is a vehicle front elevation illustrating a specific disposition of the image pickup unit in an embodiment of the invention.

Next, the positioning of the image pickup unit will be described in detail, as shown in FIGS. 5 and 6, exemplified by the camera $C_{FL}$ which is mounted on the left front corner. In this example, the camera $C_{FL}$ is assembled in a side lamp housing 92 which is integrated with a front lamp housing 91, as shown, so that it can be mounted on an existing vehicle at a low cost, with a slight modification. Of course, the lamp could be reduced in size to mount the camera in the freed space, in the outer body panel avoiding the lamp, or the camera can be mounted directly on the surface of the vehicle body. Thus, the camera $C_{FL}$ views not only the outermost edge (i.e., the left corner of the front bumper) 90 of the left front corner of the vehicle just below the camera $C_{FL}$ but also infinity. In order to provide a range of view as wide as possible to satisfy the above-specified conditions, however, the camera $C_{FL}$ has to be a wide angle camera to view a range of about 90 degrees or wider for the vertical field angle $\alpha_F$ and a range of about 90 degrees or wider for the transverse field angle $\alpha_{FL}$, although these ranges will differ depending upon the type of vehicle. However, an excessively wide angle field of view would increase the discrepancy with the perception of distance, as actually sensed by the driver, so that it is limited. Therefore, in this embodiment the camera $C_{FL}$ has a vertical field angle $\alpha_F$ of 97 degrees and a transverse field angle $\alpha_{FL}$ of 125 degrees.

Figure 7:
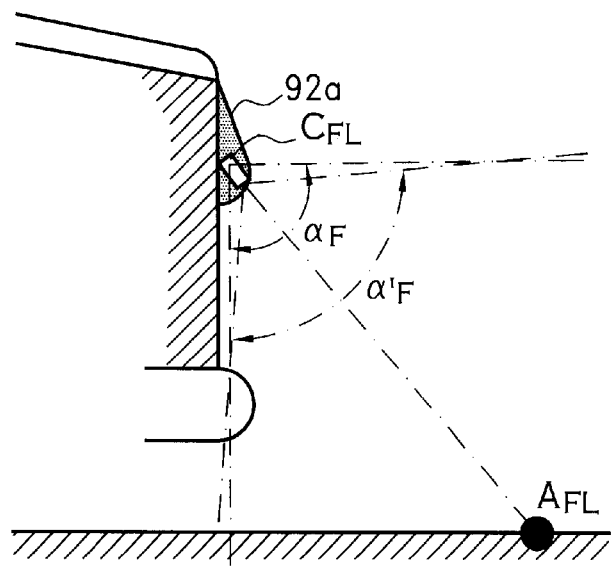
FIG. 7 is a sectional view schematically showing a modification of the disposition of the image pickup unit.
Figure 8:
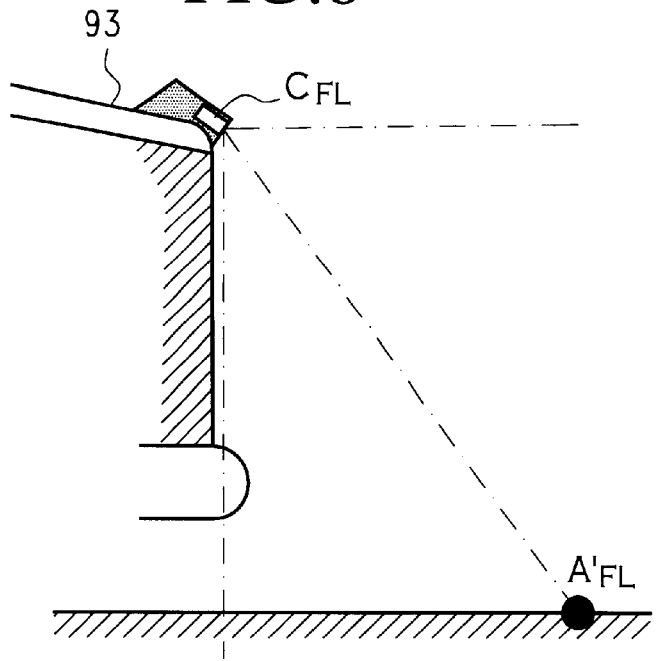
FIG. 8 is a sectional view schematically showing another modification of the disposition of the image pickup unit.
Figure 9:
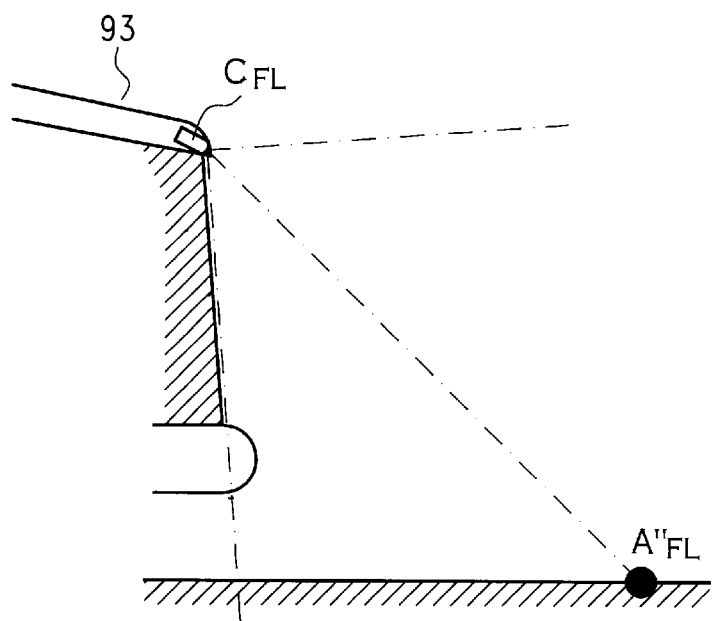
FIG. 9 is a sectional view schematically showing still another modification of the disposition of the image pickup unit.

FIGS. 7 to 9 show modifications of the method of mounting the camera $C_{FL}$. FIG. 7 shows an example in which the camera $C_{FL}$ is mounted on a lamp cover face 92a. Of course, the camera $C_{FL}$ can also be mounted on the outer panel of the vehicle body. On the other hand, FIG. 8 shows an example in which the camera $C_{FL}$ is mounted on a bonnet 93, but the camera can be likewise mounted on the vehicle body. FIG. 9 shows an example in which the camera $C_{FL}$ is mounted in the bonnet 93. Thus, it is possible to provide various mounting structures. The examples of FIGS. 7 and 8 bulge so large from the contour of the vehicle body that they are undesirable in terms of design and air resistance, but are advantageous in that they can be mounted as is on existing vehicles. On the other hand, the example of FIG. 9 reduces the bulge but requires drastic change for its mounting. In the example of FIG. 7, as compared with the fundamental arrangement of FIG. 5, on the other hand, the bulge from the lamp housing becomes so large that a camera $C_{FL}$ having a field angle $\alpha_F$, larger than that $\alpha_F$ of the case of FIG. 5, is required to provide the same range for the vehicle as that of the arrangement of FIG. 5. A smaller field angle range reduces the distortion of the screen. From this reasoning, the structure in which the camera is mounted in the side lamp face, as in the arrangement of FIG. 5, is relatively acceptable if considered from the aspects of optics, air resistance, cost and design. However, the structures of the individual automobiles and the tastes of the users vary, and the camera arrangement may be suitably selected.

Figure 10:
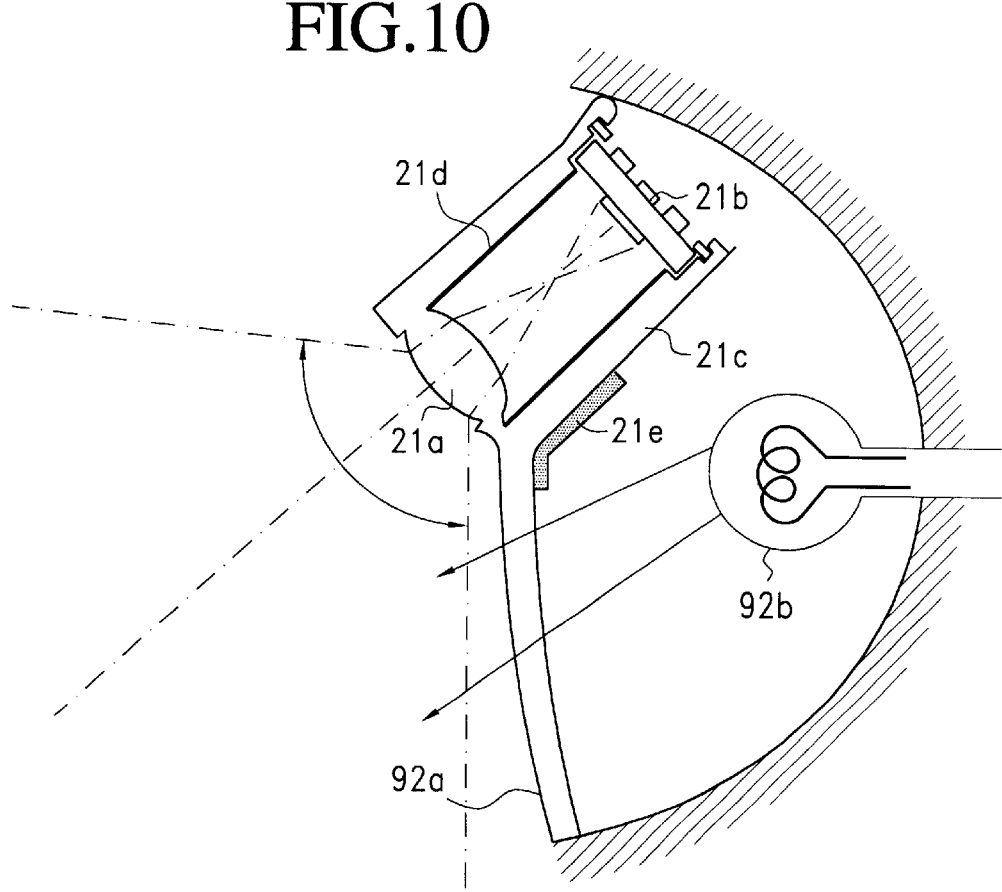
FIG. 10 is a sectional diagram showing a structure for mounting the image pickup unit within a lamp housing.
Figure 11:
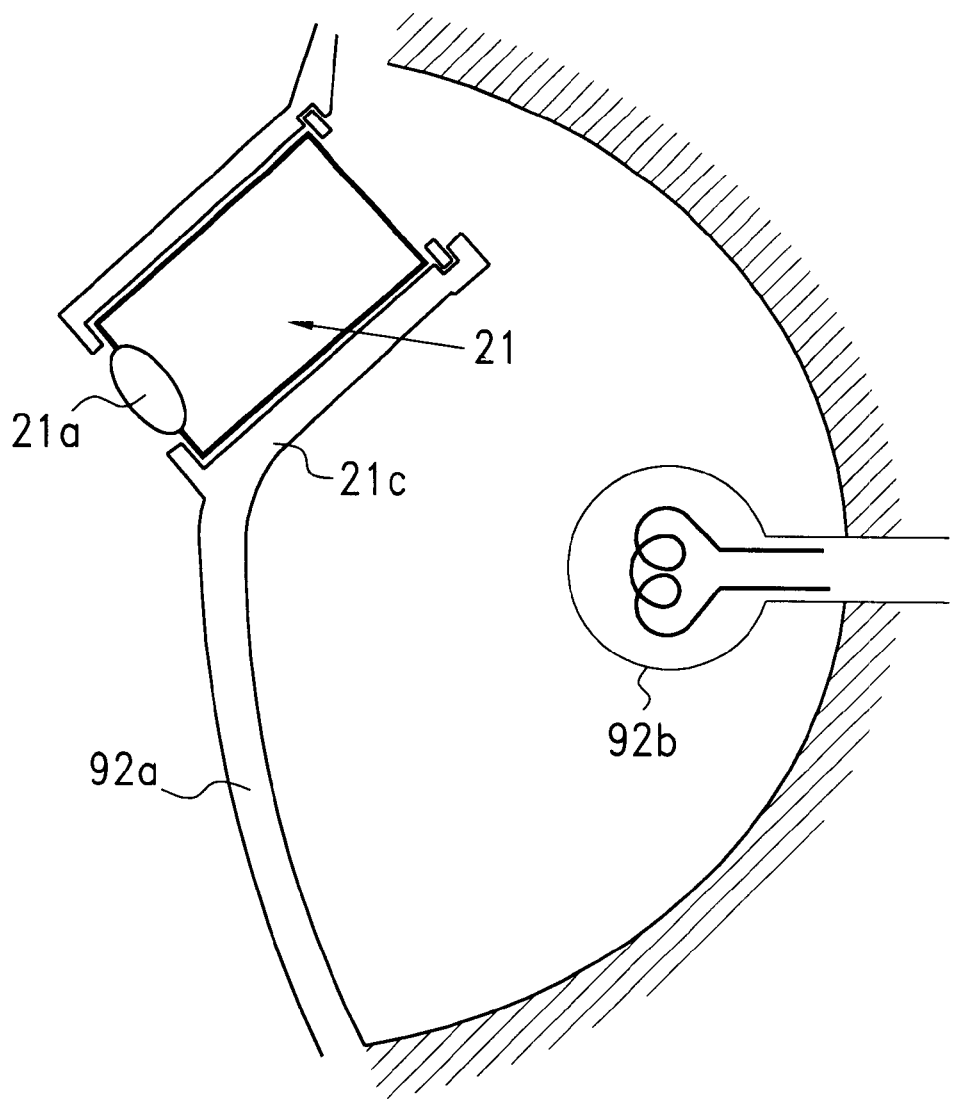
FIG. 11 is a sectional diagram showing a modification of the structure shown in FIG. 10.

Specific examples of mounts for the camera in the side lamp cover are shown in FIG. 10 and FIG. 11. In the structure of FIG. 10, a camera lens 21a and a cylindrical portion 21c for mounting a CCD circuit substrate 21b are integrally formed in the lamp cover 92a. In this structure, a cylindrical shielding member 21d for directing light through the lens 21a is mounted in or applied to the inner surface of the cylindrical portion 21c, and another shielding member 21e is mounted in or applied to the inner face of the lamp cover 92a so that the light from a light emitting unit 92b of the side lamp may not come directly into the CCD lens 21a. The circuit substrate 21b packaged with the CCD is suitably fixed on the rear end of the cylindrical portion 21c. In the structure of FIG. 11, on the other hand, the cylindrical member 21c of the lamp cover is not equipped with the lens but merely acts as a support for mounting the camera 21.

Figure 12:
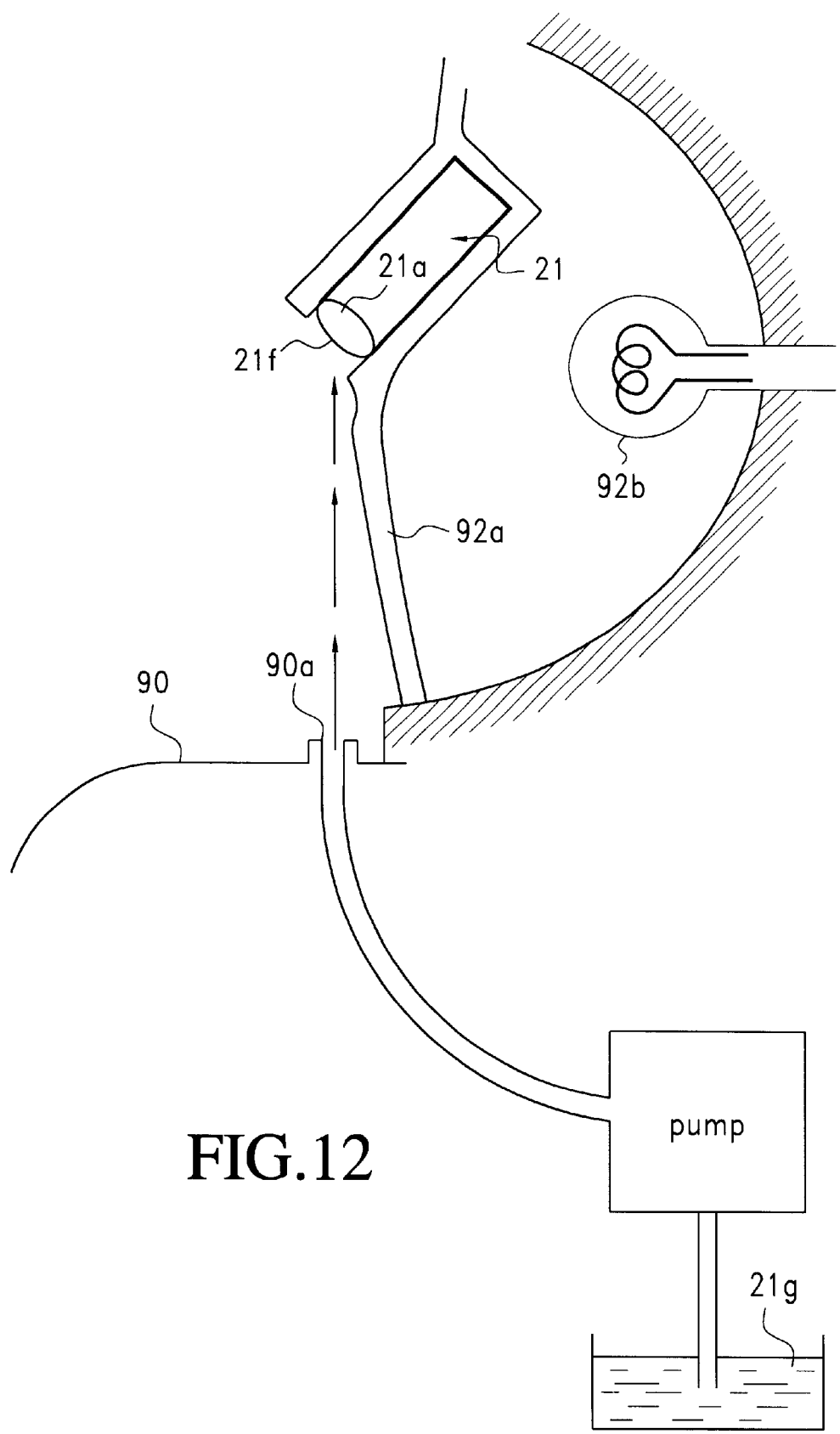
FIG. 12 is a sectional view schematically showing means for washing dirt from the lens of the image pickup unit.

In both of the examples thus far described, the camera lens 21a is exposed to the outside of the vehicle body so that its surface may become covered by the engine exhaust gases or mud while the vehicle is stopped or running, fogged with water droplets or frozen. Thus, it may become hard to take the image. FIG. 12 shows a combination of two methods for solving such a problem. The first method is to apply a stick preventing agent 21f to the outer surface of the lens 21a. In this case, the anti-stick agent may be directly applied to the lens 21a, or this lens may be covered on its surface with a member having an anti-stick agent. Stick preventing agents are exemplified by an optical catalyst of titanium oxide which is activated by light. The second method is to clean the surface of the lens 21a by spraying a rinsing liquid 21g directly onto that surface by means of a pump. An outlet port 90a for the rinsing liquid 21g is formed in the bumper 90 in the example shown, but the position of the outlet port 90a may be located anywhere if it can spray the rinsing liquid 21g directly onto the lens 21a.

Figure 13:
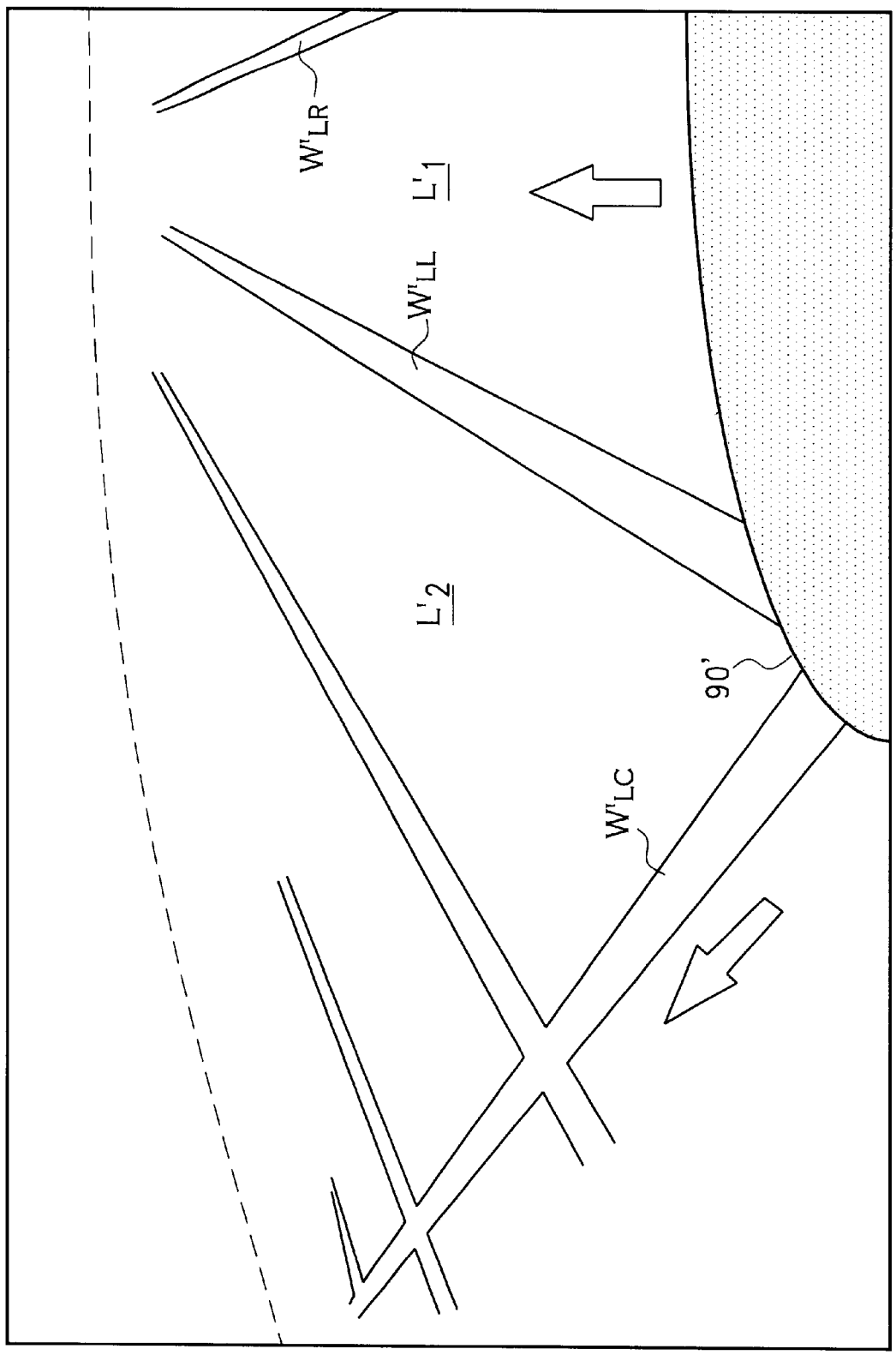
FIG. 13 shows a monitor display screen displaying a left front corner of a vehicle.

With proper orientation and disposition, it is possible to achieve the natural picture the invention aims at. FIG. 13 shows a detailed example of the picture $P_{FL}$ of the camera $C_{FL}$ at the front left corner of the automobile. FIG. 13 illustrates, as an example, a picture from a left front corner of the vehicle which is focused to a vertically upper portion of an intersection between the white line $W_{LL}$ in the forward direction, as drawn on the road surface, and a white line $W_{LC}$ perpendicular to the former. With reference to the bumper corner 90' of the vehicle, this screen can overlook a wide range covering the vehicle's path of advance $L'_1$ defined between the right white line $W'_{LR}$ and a left line $L'_2$ perpendicular to white line $W'_{LC}$, and infinity (as indicated by broken line) in the entirety of the transverse widthwise dimension of the screen. This view includes infinity extending its entire width and the front of the vehicle, i.e., the longitudinal center axis of the vehicle is shown as extended to infinity. This front infinity is horizontally displayed on the monitor over the bumper corner 90' of the vehicle.

Image Display Control

The monitor or the display means is exemplified in this embodiment by the display 5 of the navigation system. This monitor is disposed in the vicinity of the instrument panel in front of the driver. Moreover, when the driver views the screen he not only recognizes the upper portion of the screen as the physical upper portion but also recognizes it as the front view in the direction of travel of the vehicle because all the traffic symbols or guides on the road are displayed indicating that the entire upper portion of the screen is the front view. It is also natural that the lower portion of the screen is recognized the physical lower portion and as the rear view.

In actual practice, the positions of the cameras 21 are set so that the individual pictures shown in FIG. 13 are obtained. Specifically, the cameras $C_{RL}$ and $C_{RR}$ at the back of the vehicle are mounted in a so-called "upside-down" orientation. As shown in FIG. 1, more specifically, the camera $C_O$ has its optical axis aligned to intersect the vertical line defined by the seated driver and tilted slightly downward to position the front of the vehicle body at the upper portion of the screen. The camera $C_{FL}$ is positioned by inclining its optical axis from that state forward and leftward and by inclining it rightward on the optical axis. On the other hand, the camera $C_{FR}$ is positioned by inclining its optical axis forward and rightward and by inclining it leftward on the optical axis. Likewise, the cameras $C_{RL}$ and $C_{RR}$ are positioned by inclining their axes backward and leftward and rightward and by turning them on the optical axes. FIG. 1 shows the longitudinal inclinations and the transverse inclinations but not the turns on the optical axes. With these positions being set, the desired screen is achieved by displaying the pictures as they are on the display 5. It is conceivable to form the so-called "mirror image", which is formed on the back mirror, by reversing the image information transversely and by displaying the reversed picture on the monitor. However, this mirror image is not adopted in the preferred embodiments, because it does not match the senses with the system. In the picture thus obtained, the left and right white lines $W'_{LL}$ and $W'_{LR}$ on the screen are directionally aligned with the actual white lines $W_{LL}$ and $W_{LR}$ viewed from the position of the driver, as shown in FIG. 4.

Figure 14:
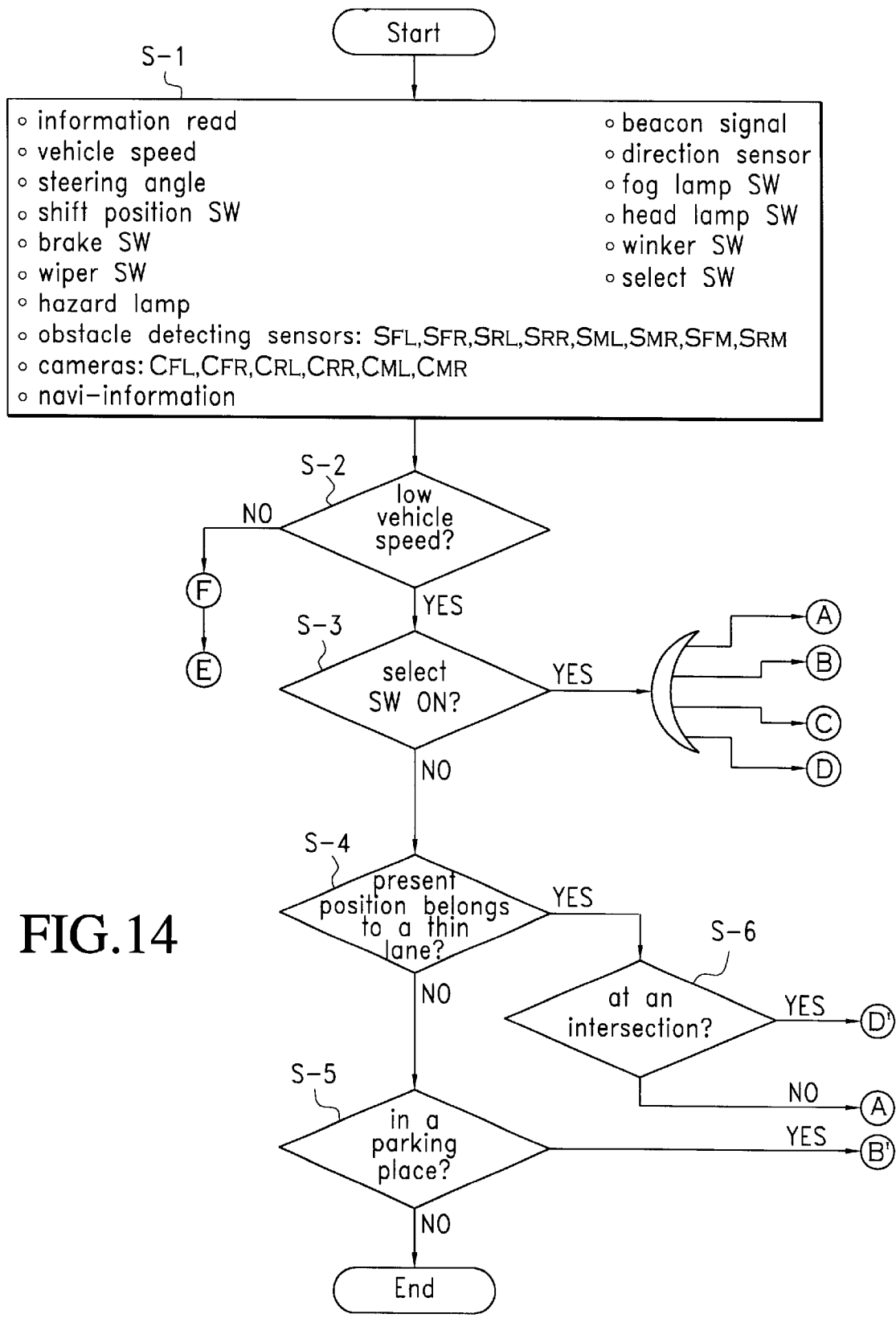
FIG. 14 is a flow chart of a routine for overall operation of the entirety of the drive assisting system.

The picture information thus obtained is selected according to the place, situation and so on and to give the driver a view restricted to the necessary minimum, according to the demand of the driver. The flow chart of a routine for control of the entire system with such restriction of information is shown in FIG. 14. This system is basically divided according to the kinds of driver's operations and constructed to aid: a side movement operation, as indicated by circled letter A; an obstacle avoiding operation, as indicated by letter B; a parking operation, as indicated by letter C; a blind cornering operation, as indicated by letter D; a back blind spot angle confirmation, as indicated by letter E; and white line confirmation, as indicated by letter F.

In order to execute the aforementioned assisting operations A to F, in the first Step S-1, data is read from the input unit 2 shown in FIG. 2. In the next Steps S-2 and S-3, the working functions are divided, taking into consideration safety and necessity for the speed range. When the low speed range is decided in S-2, based on input of a vehicle speed sensor 25, a decision that the select SW (switch) is or is not "ON" is made in Step S-3. If the answer in S-3 is YES, a screen display is made according to the selection of the side movement operation A, the obstacle avoiding operation B, the parking operation C or the blind cornering operation D. If the decision as to the low speed range in Step S-2 is NO, because the vehicle is running at an intermediate or high speed, the screen display is selected for the back dead angle confirmation E and the white line confirmation F. Here, different standards are required for the individual functions in accordance with the speed range, but their specific settings may be individually made by tests, evaluations and so on.

Next, when any of the switches A to D is selected at the low vehicle speed, a routine for one of the functions corresponding to the selected SW is started. These functions/subroutines are basically independent so that they cannot be selected in plurality. The system is so constructed that even if no switch is selected, any of the side movement operation A, the obstacle avoiding operation B and the blind cornering operation D can be automatically activated by the following decision based on the navigation information read at the first Step S-1, because safety is considered in display of those operations. Specifically, it is decided in Step S-4 whether or not the present position is within a narrow lane. If this answer is YES, the blind cornering operation D or the side movement operation A is selected depending on the decision in Step S-6 as to whether or not the vehicle is at an intersection. If the answer in Step S-4 is NO, on the contrary, it is decided in the next Step S-5 whether or not the vehicle is in a parking place. If this answer is YES, the obstacle avoiding operation B is displayed. These operations are represented by circled letters A, B' and D'. In the case of intermediate or high vehicle speed, on the other hand, Step S-2 advances from the white line confirming function F to the back dead angle confirming function E. These individual functions/subroutines will now be individually described.

Sideward Movement Assist

Figure 15:
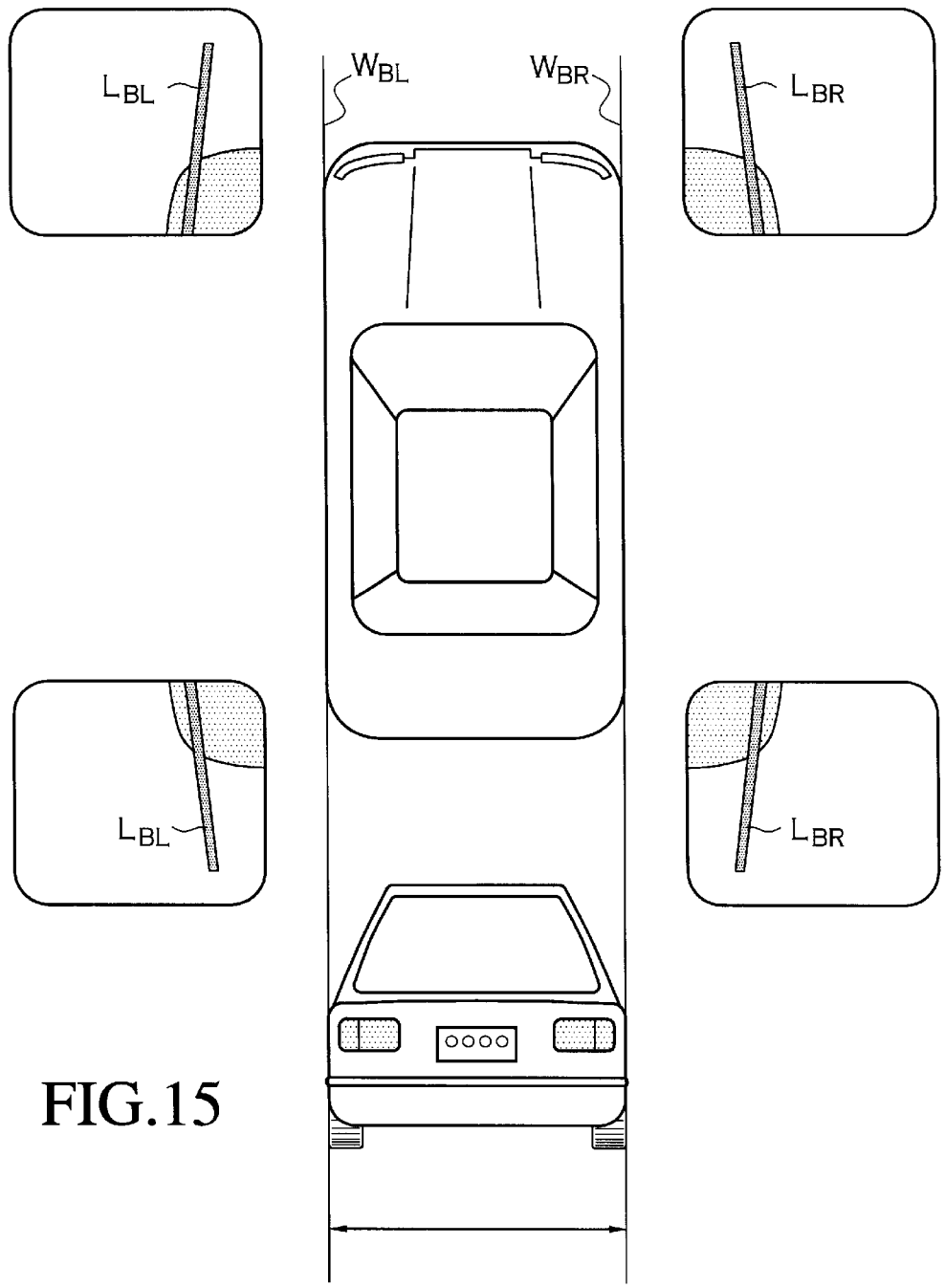
FIG. 15 is an explanatory diagram showing the monitor display screen in sideward movement assist.
Figure 16:
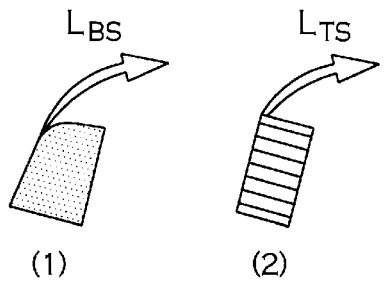
FIG. 16 is a picture diagram of a display with a predicted locus in contrast.

The assist display method for a side movement operation is based on, as shown in FIG. 15, extension of the outermost lines $W_{BL}$ and $W_{BR}$ of the vehicle vertically to the ground surface and by superimposing lines (in parallel with the vehicular center axis) $L_{BL}$ and $L_{BR}$ extending in the longitudinal direction of the vehicle from the former lines, on the screen. In this case, the outer side lines of tires may be displayed in place of the outermost side lines $L_{BL}$ and $L_{BR}$. Moreover, these outer side extended lines need not necessarily be strictly adjusted to the outermost side of the vehicle or the outermost sides of the tires but, rather, can be given a margin of about 20 cm from these outermost sides. In another method, as shown in FIG. 16, the predicted loci $L_{BS}$ and $L_{TS}$ of the outermost side lines of the vehicle or the outer side lines of the tires are displayed, as indicated at (1) or (2), in accordance with the steering angle. The method for displaying those predicted loci will be described in detail in connection with the obstacle avoiding operation. The pattern of the display lines can be any one of various shapes, such as a single line, as shown in FIG. 15, a plurality of lines at an interval of about 10 cm, an image of the tire outer side line $L_{TL}$ with a tire image $T_I$, as shown in FIG. 17(1), or an image of a ground surface $G_I$ or the outer side face $B_I$ of the vehicle 9, as shown in FIG. 17(2).

Figure 18:
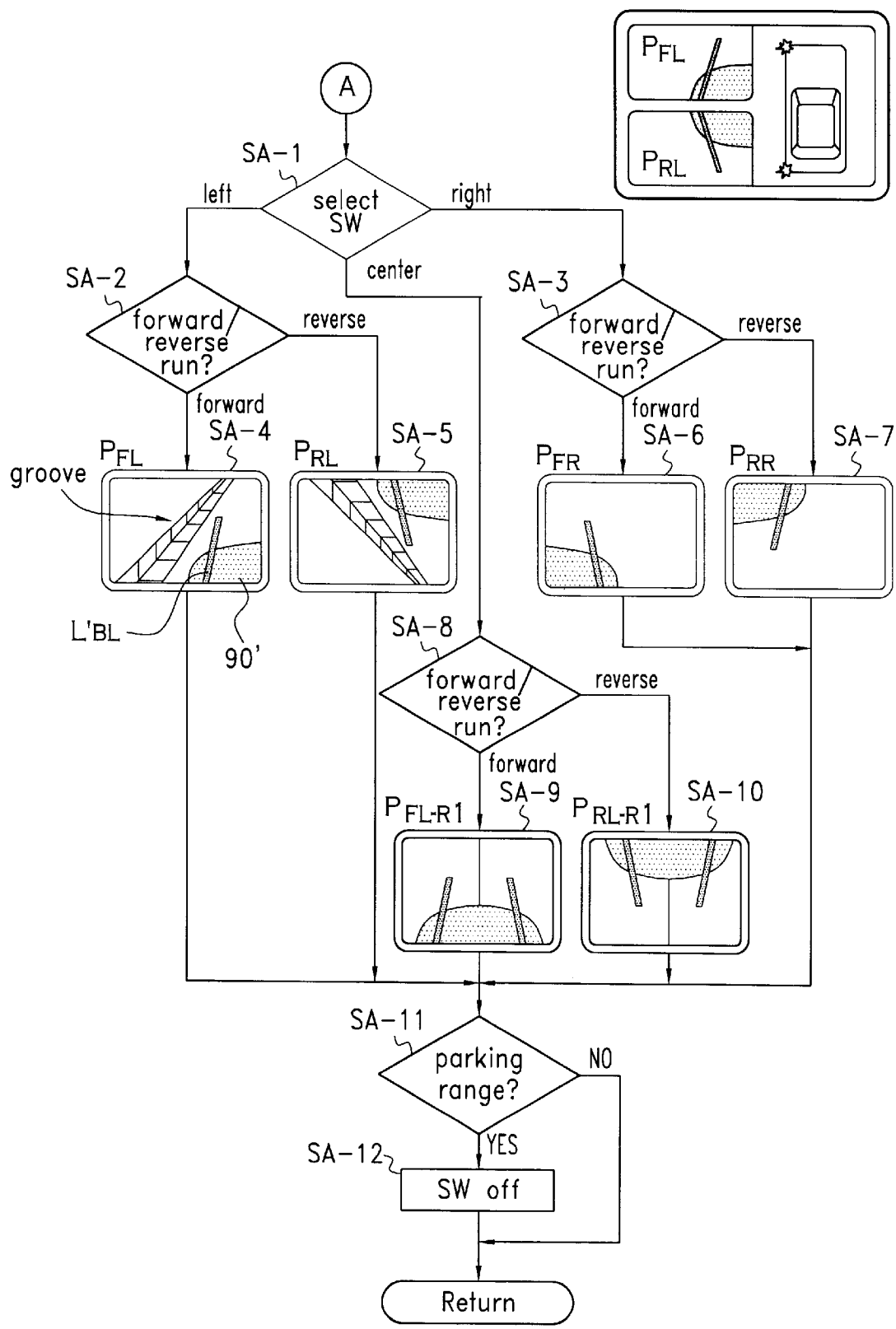
FIG. 18 is a flow chart of a sideward movement assist routine.

Next, the display is determined by the driver's selection of leftward approach or rightward approach, by operation of the select switch SW shown in FIG. 2, or by the present location of the vehicle in a narrow lane other than at an intersection, as determined from the navigation information. A flow chart of this control with the switch selection is shown in FIG. 18. The side movement operation is activated only at a low vehicle speed, not at a high vehicle speed. This is because the side movement operation is dangerous at a high vehicle speed, and the image information per se may divert the attention of the driver. At first, when it is intended during forward running to approach as near a left curb as possible and to stop the vehicle, the driver selects the leftward approach SW. This selection is decided at Step SA-1. If the vehicle speed in this state is lower than a predetermined value, forward running holds from the decision of Step SA-2 so that the picture $P_{FL}$ of Step SA-4 is displayed. Therefore, the driver is able to make a side approach easily by driving the vehicle to bring the outermost left side line $L_{BL}$ of his vehicle to the curb on the screen. When the side approach is completed, the shift lever is moved to the "P" position. Then, the resultant input of a position SW (or switch) 23 is decided at Step SA-11, and the select SW is released at Step SA-12 so that the side approach assist is completed. Other conditions which may be detected for this release are that the vehicle remains motionless for at least a predetermined period of time with the shift lever being in the "N" position, that the vehicle has stopped for at least a predetermined period of time with the brake SW (or switch) being ON, or that the engine has stopped. When reverse movement is necessary during the side approaching operation, the shift lever is set to the "R" range position. Then, the decision of Step SA-2 in response to the input of the position SW (or switch) 23 changes the picture to $P_{RL}$ at Step SA-5 to thereby display the reverse assist screen. Especially in the case of reverse, the front left corner of the vehicle turns to the left and right. It is, therefore, advantageous to display the pictures $P_{FL}$ and $P_{RL}$ simultaneously, as illustrated at the right upper portion of FIG. 18. Here, the description thus far made assumes the general front wheel steering mechanism. In the case of the four-wheel steering mechanism adopted in some vehicles, however, it is advantageous to display the two pictures simultaneously in forward running, as shown at the right upper portion in FIG. 18.

When it is desired to bring the vehicle aside rightward, on the other hand, the decision of the rightward side approach at Step SA-1 is made by selecting the rightward approach SW so that the screen display is switched to that of Step SA-6 or Step SA-7 in accordance with the forward/reverse run decision of Step SA-3. Also when the vehicle passes another vehicle on a narrow lane or a road narrowed by an obstacle, the aside approach center SW is selected. Then, the left and right pictures of the forward or reverse running can be simultaneously displayed on one screen at Step SA-9 or Step SA-10 in accordance with the decisions of Step SA-1 and Step SA-8 so that the assist matches the driving operation. Here, the screens other than that for the leftward side approach of FIG. 18 are simplified by partial omission. The actual display screen includes the view as in the leftward side movement screen.

In the case of the automatic display responsive to the navigation information, the decision in Step SA-1, as shown in FIG. 18, is replaced by a decision regarding the steering angle, and the screen display is made at and after Step SA-2 according to a scheme similar to that of the switch selection. In this routine for passing on a narrow lane, the display is released by an increase in the vehicle speed, unlike the case of control by switch selection.

Obstacle Avoidance

Figure 19:
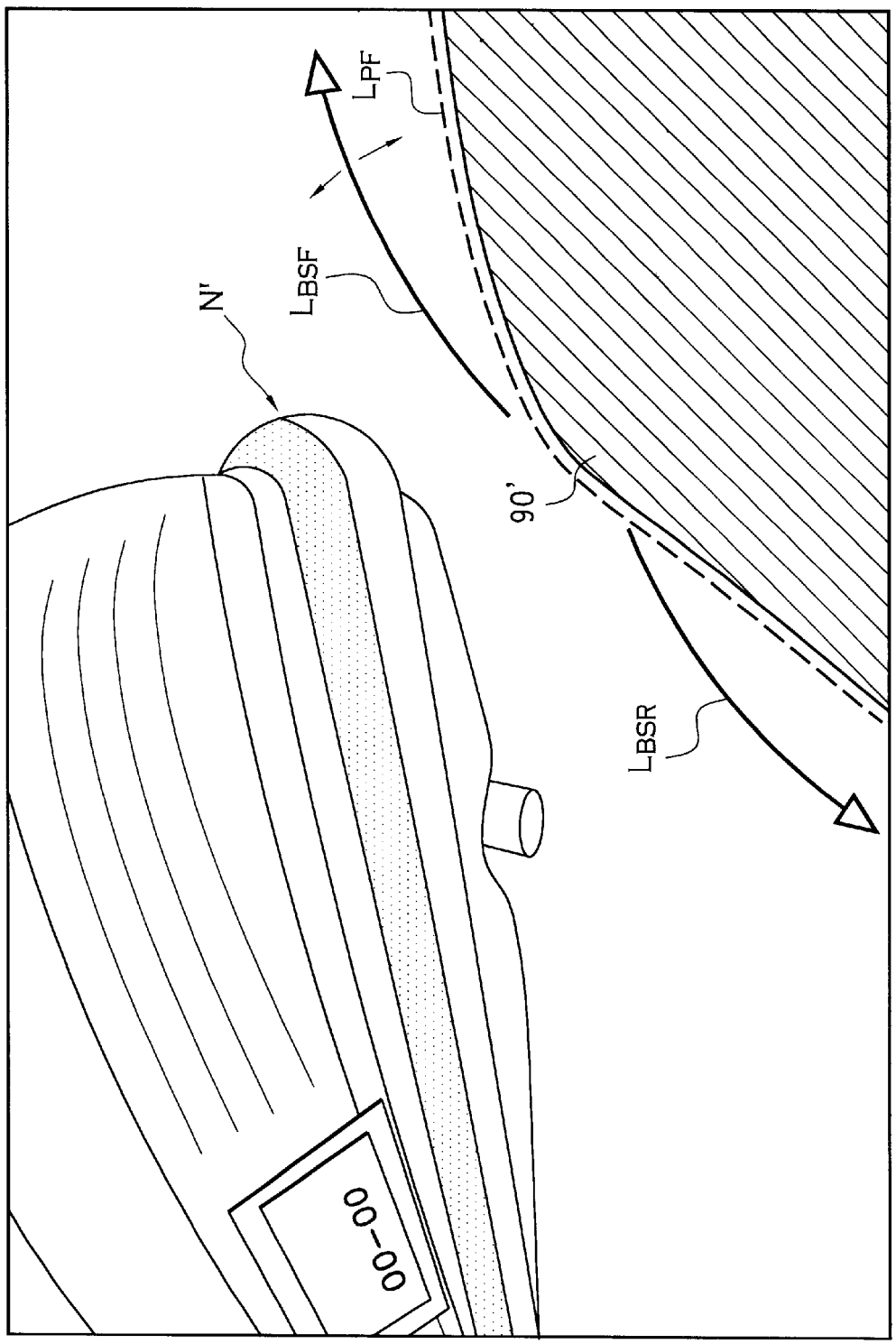
FIG. 19 shows a monitor screen display in an obstacle avoiding routine.
Figure 20:
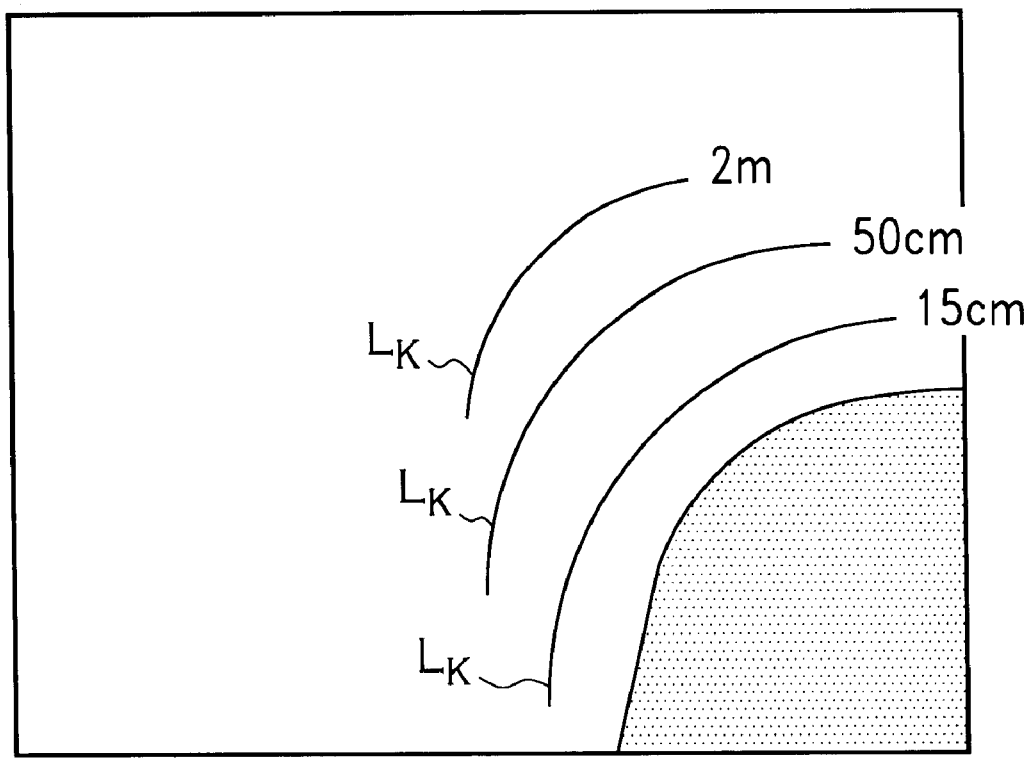
FIG. 20 shows a screen display with distance lines superimposed.

In an obstacle avoiding operation, exemplified by avoidance of a vehicle parked ahead of the left front corner of the operator's vehicle, as shown in FIG. 19, the predicted locus $L_{BS}$ of movement of the left front corner, according to the steering angle, is displayed. A predicted forward running locus $L_{BSF}$ and a predicted running reverse locus $L_{BSR}$ are separately displayed. The predicted locus $L_{BS}$ is not an imaginary line on the ground, unlike the sideward movement operation, but represents a line of movement of the outermost point on the left corner. This is because the line is intended to avoid an obstacle N', as shown in FIG. 19, and to make it clearly visible to the driver. In the case of this screen, it is also conceivable to display a distance line $L_K$ presenting a criterion for the clearance, as shown in FIG. 20. When the outside environment of the vehicle is dark, when the vehicle has a dark color, or when the shadow of the vehicle body or another object is projected on the road surface by the light of the sun or a lamp, it may become difficult to discern the contour of the vehicle. For this case, as shown in FIG. 19, the contour (or the outermost edge line of the vehicle) $L_{PF}$ of the vehicle body can be easily determined if it is superimposed over the outermost line of the vehicle body 90 on the screen.

Figure 21:
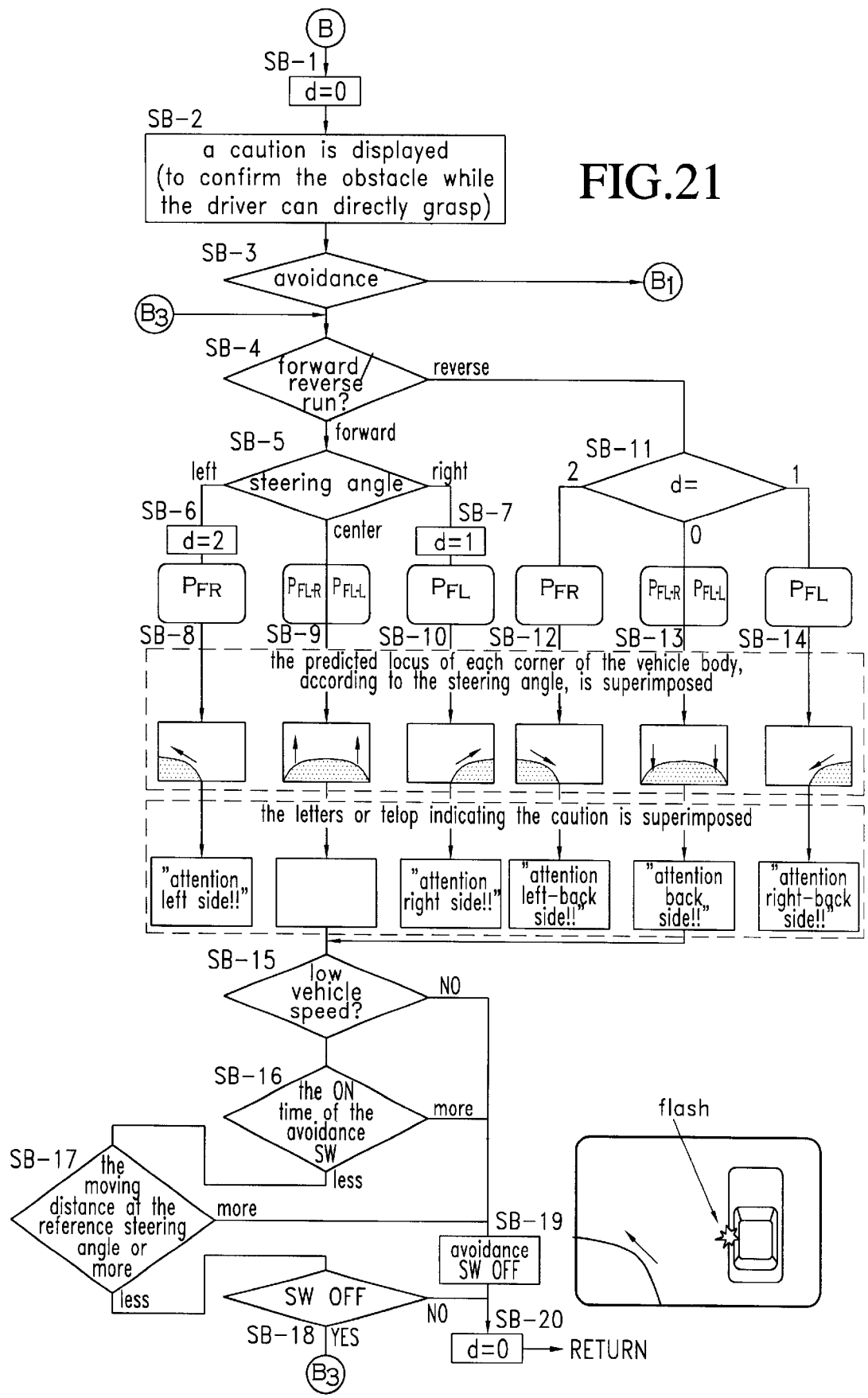
FIG. 21, in conjunction with FIGS. 22 and 23, is a flow chart of an obstacle avoiding routine.

This display is restricted to low vehicle speed, as in the sideward movement operation, in accordance with the flow chart of FIG. 14. When the obstacle avoiding operation is selected by the select SW, moreover, the routine advances to the subroutine B. In this subroutine B, as shown in FIG. 21, the data is initialized (d=0) in the first Step SB-1. At the next Step SB-2, a caution flag is displayed The reason is as follows. The present system assists the driver by giving the driver the distance from such an obstacle as the image information which cannot be confirmed directly from the driver's seat. Therefore, the display entrusts the driver to confirm the obstacle while the driver can directly determine the distance between the obstacle and the vehicle. At the next Step SB-3, the front or back of the vehicle to avoid the obstacle is decided. If this decision indicates the front, forward or reverse is decided at Step SB-4 from the read information for the shift position SW.

When the answer for forward running is YES, the display picture is set by the steering angle decision of Step SB-5. With a leftward steering angle, the flag (d=2) so indicating is set at Step SB-6. When a front obstacle is to be avoided in this case, the picture $P_{FR}$ (as shown in FIG. 4) of the CCD camera which is disposed at the right front corner, is displayed at Step SB-8 because the right front corner of the vehicle is nearest the obstacle, and the predicted locus of the right corner of the vehicle body according to the steering angle is superimposed over that picture. At this time, the movement of the vehicle body may invite contact with another obstacle by lefthand involvement. Therefore, the letters or telop indicating caution is superimposed on the same screen. Here, another method of attracting attention is to display a figure indicating the vehicle and a portion thereof requiring attention on the screen, as shown at the right lower portion of FIG. 21. In this example, the display of the portion requiring attention may be represented by a flashing light. Still another method is to detect an obstacle by distance sensors S individually disposed, as shown in FIG. 3, and to display the portion of the vehicle, approaching within a reference distance, with a flashing warning color in the display of FIG. 3. Attention may also be called by speech or sound.

Likewise, in the case of rightward steering, a flag (d=1) indicating the rightward steering angle is set at Step SB-7, and the picture $P_{FL}$ is displayed at Step SB-10. When the steering angle is 0 or no more than a reference value, on the other hand, the two left and right screens are simultaneously displayed at Step SB-9. The screens displayed in this case are a left half $P_{FR-L}$ of the right corner picture and a right half $P_{FL-R}$ of the left corner picture.

The conditions for releasing the aforementioned controls are any of a vehicle speed at or below a reference value, a time period after the avoidance SW is ON which has reached a reference value or greater, a distance traveled at the reference steering angle which is at least a reference value, or release of the avoidance SW by the driver. For this release: the low vehicle speed is decided at Step SB-15; the ON time of the avoidance SW is decided at Step SB-16; and the distance traveled at the reference steering angle is at least a reference value is decided at Step SB-17. When the release conditions are satisfied, the avoidance SW is turned OFF at Step SB-19. When the avoidance SW is already OFF at Step SB-18, the flag d is initialized (d=0) by the operation of Step SB-20, and the routine returns to the START.

When Step SB-4 decides that the avoidance SW is at the front and that the position SW is reverse, on the other hand, it is estimated that the obstacle to be avoided is ahead, and that the driver desires reverse. Independently of the steering angle, therefore, the picture selected in forward running is displayed as is. In this sense, a steering angle is decided at Step SB-11 from the flag d set for forward running. The predicted locus and the caution content are made to correspond to those of reverse running, as shown. These operations are made to match the case in which the running direction is reversed for switchbacks or the like by deciding that avoidance of the obstacle ahead is impossible. When avoidance is deemed impossible before starting the avoiding operation, after reverse running, the flag setting is d=0 of the released state so that the left and right two screens are simultaneously displayed, as shown, at Step SB-13.

Figure 22:
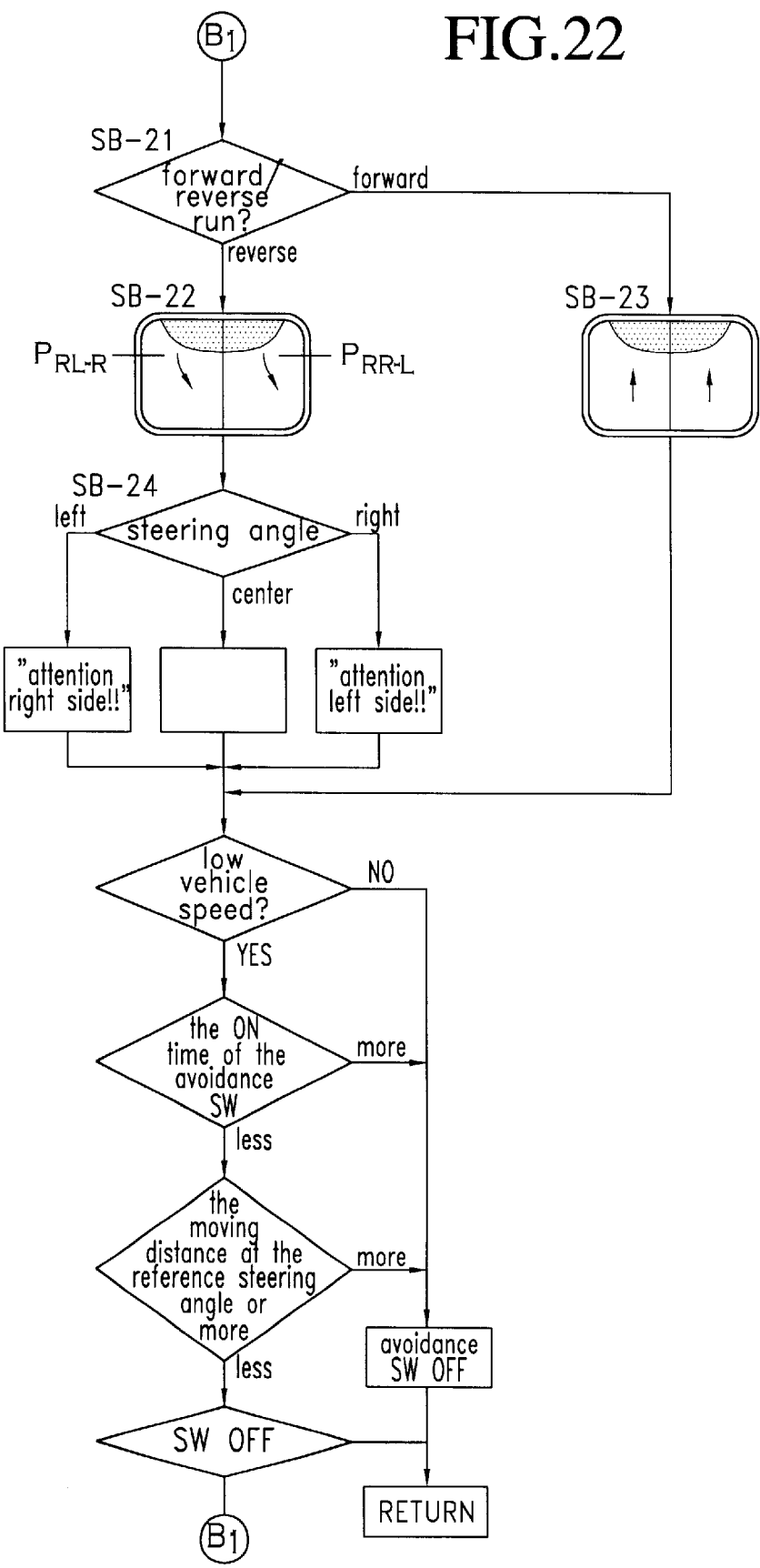
FIG. 22 is a flow chart of another portion of the obstacle avoiding routine.

When the avoidance SW is reverse, the routine shifts to the subroutine of $B_1$ from Step SB-3. In the case of reverse, also the pictures of the rear left and right corners may be individually displayed in accordance with the steering angle. In the case of reverse, however, a method of displaying the left and right pictures simultaneously is adopted, because the direction of the vehicle body angle changes little with respect to the steering angle and because reverse is intrinsically liable to create a blind spot. In this case, too, the predicted locus and the caution content are made to correspond to the steering angle. As shown in FIG. 22, more specifically, forward or reverse is decided at Step SB-21 from the information read for the shift position SW. No matter what this decision might be, moreover, at Step SB-22 or Step SB-23, screens $P_{RL-R}$ and $P_{RR-L}$ are displayed, and the predicted loci according to the forward and reverse running are superimposed. In the case of reverse, moreover, the caution is called on the basis of the steering angle decision of Step SB-24. The releasing conditions for this case are similar to those of the foregoing subroutine B.

Figure 23:
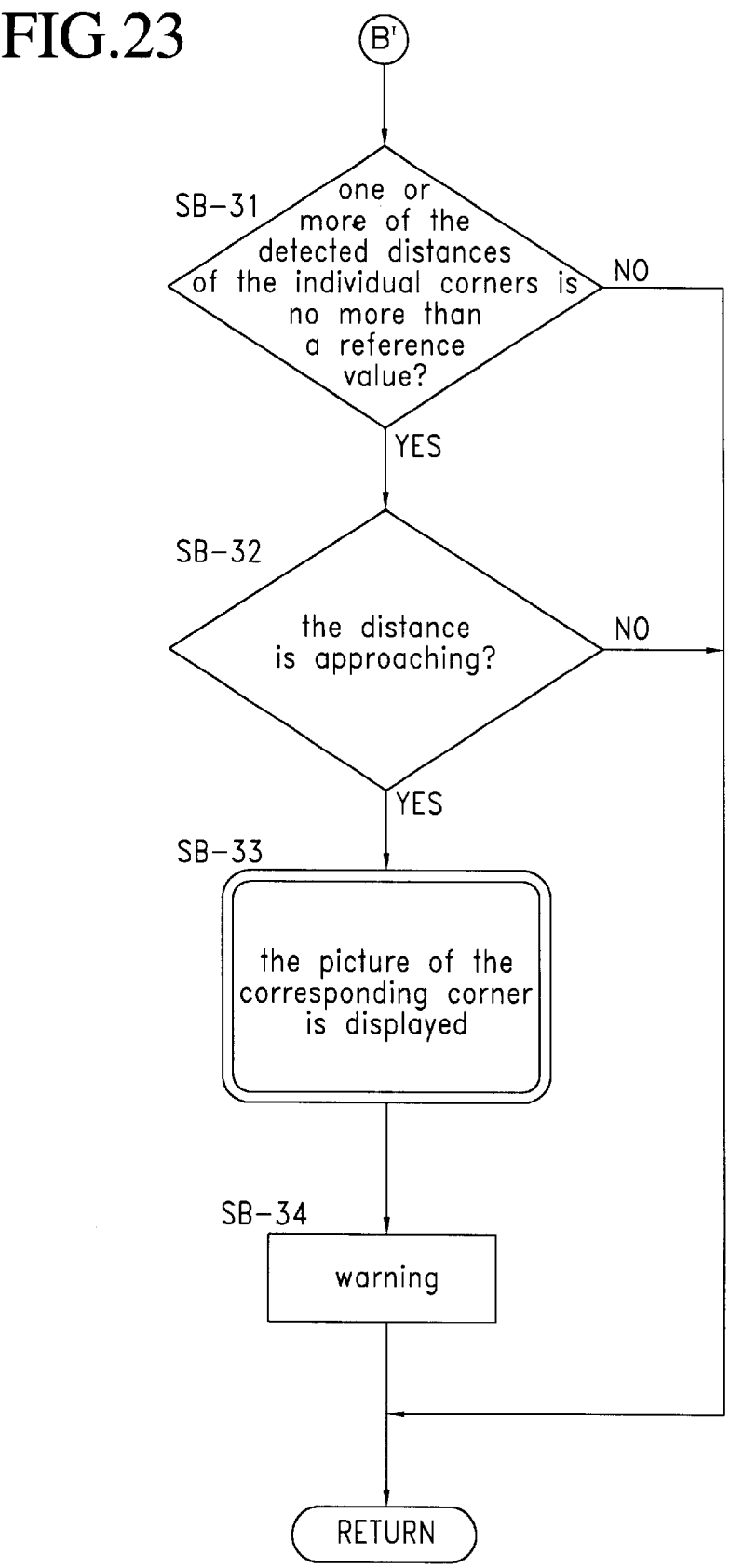
FIG. 23 is a flow chart of yet another portion of the obstacle avoiding routine.
Figure 24:
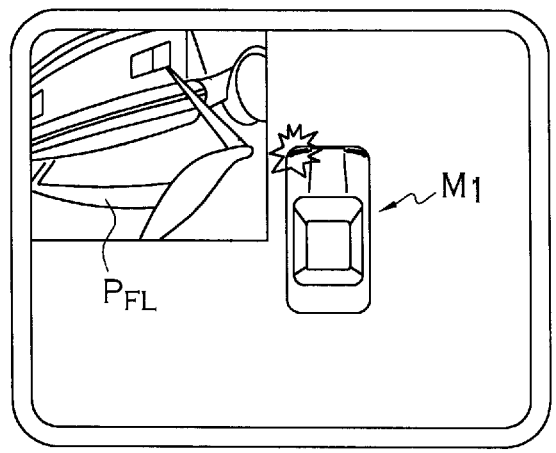
FIG. 24 is one example of a warning display screen for the obstacle avoiding operation.

When the decision of the select switch ON shown in FIG. 14 is NO and when the decision as to location in a parking place is YES, on the other hand, the routine advances to B' in response to the decision of Step S-5. When it is decided at Step SB-31 shown in FIG. 23 that one or more of the detected distances of the distance sensors 28 of the individual corners is no more than a reference value and when it is decided at Step SB-32 that the distance is diminishing, the picture of the corresponding corner is displayed at Step SB-33, and the driver is warned at Step SB-34. One example of the display screen for this case is shown in FIG. 24 in which the front left corner of the vehicle, for example, is displayed in a warning color and the picture $P_{FL}$ of the front left corner is displayed and flashed at a corresponding position. The warning may also be effected by speech or sound. Since the corresponding corners may naturally be a plurality, a plurality of pictures and warnings may then be added to the screen of FIG. 24. In this case, too, on the basis of the input of a steering angle sensor 26, there are additionally displayed the predicted loci $L_{BSL}$ and $L_{BSR}$ of the vehicle body corners corresponding to the steering angle and forward or reverse movement. This display is ended when the answers at Step SB-31 and Step SB-32 are NO.

Parking Operation

Figure 25:
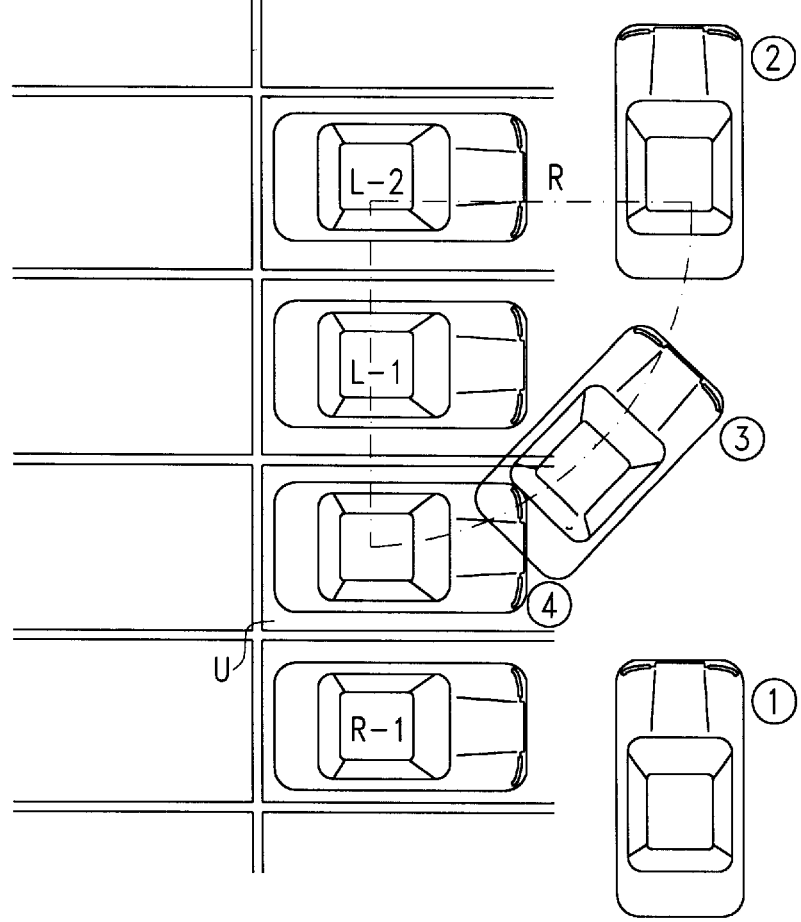
FIG. 25 is a sketch showing the sequence of positions of the vehicle in a parking operation.

With reference to FIG. 25, a backward parking operation which is recognized as the most difficult of various parking operations, will be described by way of example. In this operation: a target parking space is confirmned at position (1); the vehicle runs forward to a parking operation starting position (2); the vehicle passes a position (3) in reverse; and the vehicle stops at a parking position (4). The points for neatly parking are: how the parking operation starting position (2) is decided; and what is aimed at in position (3). In principle, the vehicle cannot be parked in one continuous movement, and switchback operations are required, if a target parking space U is inside of the minimum turning radius R of the vehicle at position (2). As a general criterion, there is employed a method of starting adjacent a second adjacent vehicle L-2 (or an imagined equivalent position) because the ordinary automobile has a minimum turning radius of about 5 m. Most drivers determine the position (2) by resort to their experience and feeling so that they find it difficult to park the automobile at the position (4) without any switchback.

Figure 26:
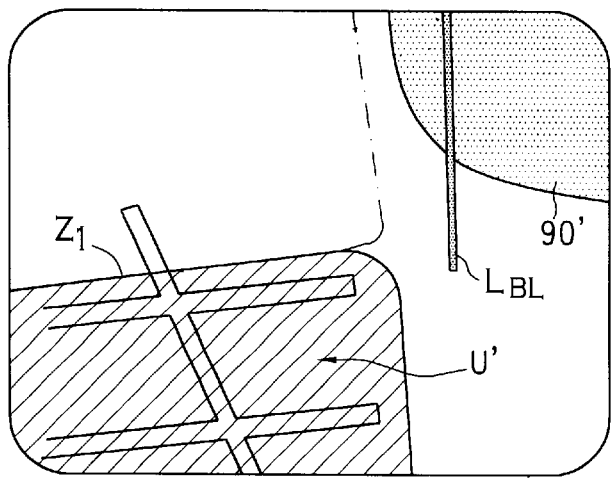
FIG. 26 shows a monitor display screen depicting a target parking space in the parking operation.
Figure 27:
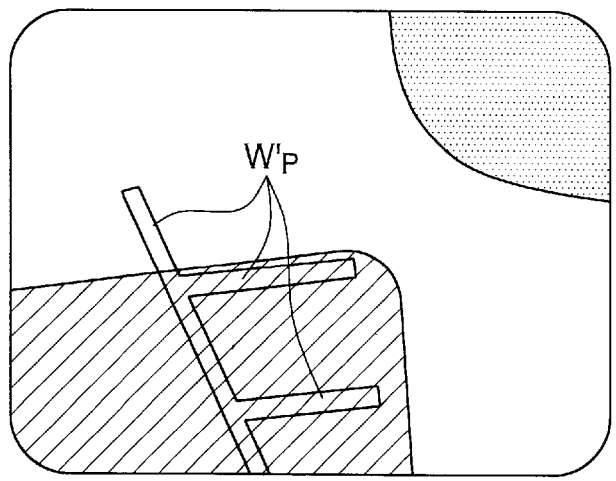
FIG. 27 shows differences on the monitor display screen due to the positional discrepancy of the target parking space in the parking operation.

According to the display method of this case, therefore, there is superimposed over the display on the monitor of the picture taken by the camera 21 the parking range which is defined by the closer of the left and right sides of the space required for the parking, i.e., the left side, as viewed from the vehicle, in the case of reverse parking to the left back, or the right side, as viewed from the vehicle, in the case of reverse parking to the right back, including the spare space needed on the left and right sides of the vehicle for reverse at the maximum steering angle of the handle. This operation will now be specifically described for the case of the reverse parking to the left back. At the parking operation starting position (2), a parking space range $Z_I$ is displayed in a left rear picture, as shown in FIG. 26. This parking space range $Z_I$ is set as a region giving margins on the left and right of the vehicle when the vehicle is completely parked in the position (4) (a position perpendicular to the position (2)), as brought thereto with the maximum steering angle from the parking operation starting position (2). The transverse boundary line, as shown in FIG. 26, presents the left hand limit (indicated by a phantom line extending from the area of the real display to the position where the vehicle is to start the parking operation in reverse) having a predetermined spacing from the vehicle side face, and the vertical boundary line presents the limit providing a predetermined margin in front of the vehicle in the position (4). Specifically, the display shape is set with reference to a white line $W'_P$ of a target parking space U' (which itself is set to leave a predetermined clearance at the front/back and on the left/right of the vehicle in the parking position) shown on the screen, as in FIG. 27. This setting method may be experimental or computational based on information regarding the vehicle, the cameras, the mounting of the cameras on the vehicle, the displays or the design standards of the parking zone. If, in actual practice, the target parking space U' has a sufficient margin within the parking space range $Z_I$, as shown in FIG. 26, when the screen is viewed at the parking operation starting position (2), the driving operation can also be performed with a sufficient margin. If the vertical and horizontal boundaries of the parking space range $Z_I$ are substantially aligned with the white line $W'_P$, as shown in FIG. 27, the vehicle can barely be parked at the predetermined position, but without any inclination by steering it backward to the maximum angle. Therefore, the downward discrepancy of the parking space range $Z_I$ from the position shown in FIG. 27 indicates that the parking operation starting position (2) is excessively to the rear, and the leftward discrepancy indicates that the parking operation starting position is excessively close to the left side.

Figure 28:
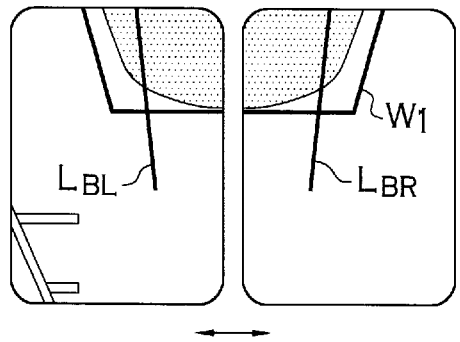
FIG. 28 illustrates a simultaneous two-picture display screen for the parking operation.

As the vehicle moves from the parking operation starting position (2) through the midway position (3) to the parking position (4), the rear left and right pictures are simultaneously displayed on one screen, as shown in FIG. 28. On the left side, as shown, the left back picture $P_{RL}$ is arranged on the left side, and the right back picture $P_{RR}$ is arranged on the right side so that the outermost side lines $L_{BL}$ and $L_{BR}$ are displayed as in the pictures $P_{FR}$ and $P_{RR}$ of FIG. 15. These pictures may also display the predicted locus $L_{BSR}$ in accordance with the steering angle. The spacing between the left and right pictures is so set as to be realistic to the driver but may be determined by testing evaluations. While the pictures $P_{RL}$ and $P_{RR}$ shown in FIG. 28 are arranged independent of each other, these pictures $P_{RL}$ and $P_{RR}$ can be observed with an overlapping range, as indicated at R in FIG. 1, because the cameras have wide-range lenses individually overlooking the vehicle body corners and infinity. By extremely simple processing, either taking the clearance between the two pictures or cutting the inner sides and arranging them, a background, quasi-synthesized picture can be constructed, an example of which is shown in FIG. 29.

Understanding can be furthered by displaying a target parking reference line $W_I$, as shown in FIG. 28. This reference line $W_I$ is superimposed on the screen and represents the slope of the parking space with the vehicle neatly parked therein. If the target parking standard line $W_I$ is operationally adjusted to the target parking space U during the parking operation, as shown in FIG. 29, the transverse clearance, the front/back position and the inclination can be clearly understood, so that even an unskilled driver can park the vehicle neatly. The driver drives the vehicle such that the reference line $W_I$ is made to correspond to the target parking space U' displayed on the screen. In addition to these displays, on the other hand, when a collision may take place, a warning is issued and displayed in the picture, as in the case of the obstacle avoiding operation B, by means of the front/back and left/right obstacle sensors 28 and cameras 21 of the vehicle, as shown in FIG. 3, to enhance safety. This parking operation assisting technique can likewise be applied to parallel parking or front end parking, the description of which will be omitted.

Figure 30:
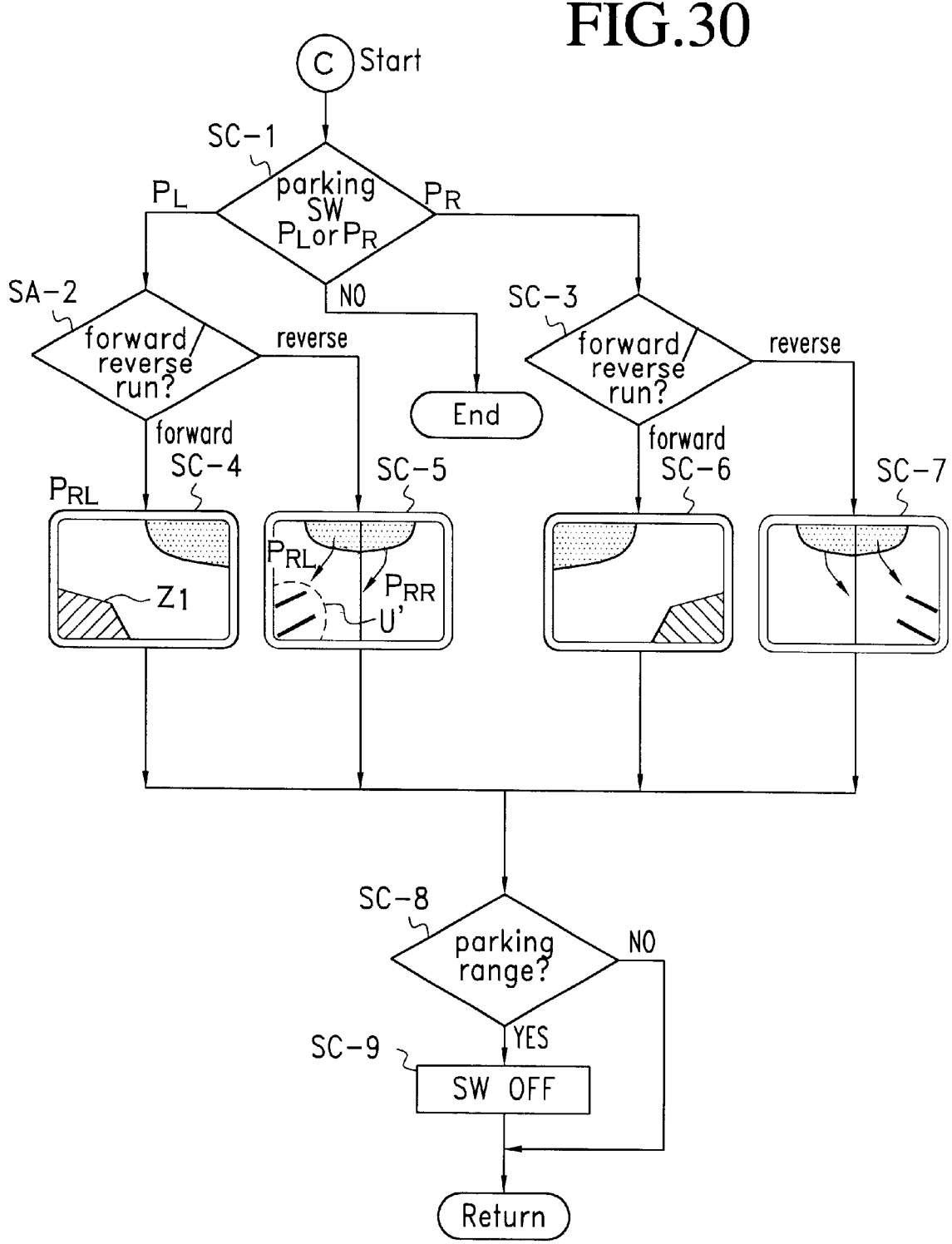
FIG. 30 is a flow chart of a routine for the parking operation.

The generation of this display follows the flow chart of the operations shown in FIG. 30. Here it is assumed that the assist routine operates only at low vehicle speed as in the foregoing two operations. This routine is started when the driver selects the parking SW shown in FIG. 4. The driver selects the $SWP_L$ in the left back parking case shown in FIG. 26, but the $SWP_R$ in the right back parking case. In response to this selection, Step SC-1 decides the left and reverse parking. When Step SC-2 decides forward running in response to the input of the position switch 23, the parking frame range $Z_f$, as described with reference to FIG. 28, is superimposed at Step SC-4 over the left rear picture $P_{RL}$ of (1). When the driver drives the vehicle so that the actual target parking space U' comes into that range $Z_f$, the driver can drive the vehicle to the position (2), as described with reference to FIG. 26. When the driver confirms this state and moves the shift lever to reverse, the two background pictures $P_{RL}$ and $P_{RR}$ are simultaneously displayed on the screen at Step SC-S so that the predicted locus line $L_{BSR}$ according to the steering angle is superimposed over the individual corners. With reference to this display, the driver drives the vehicle into the actual target parking space U' displayed in the screen. This process is shown in FIG. 29 wherein pictures (2), (3) and (4) correspond to FIG. 25. This routine is ended by the switch OFF in Step SC-9 in accordance with the shift decision as to the parking range in Step SC-8.

Blind Cornering

Figure 31:
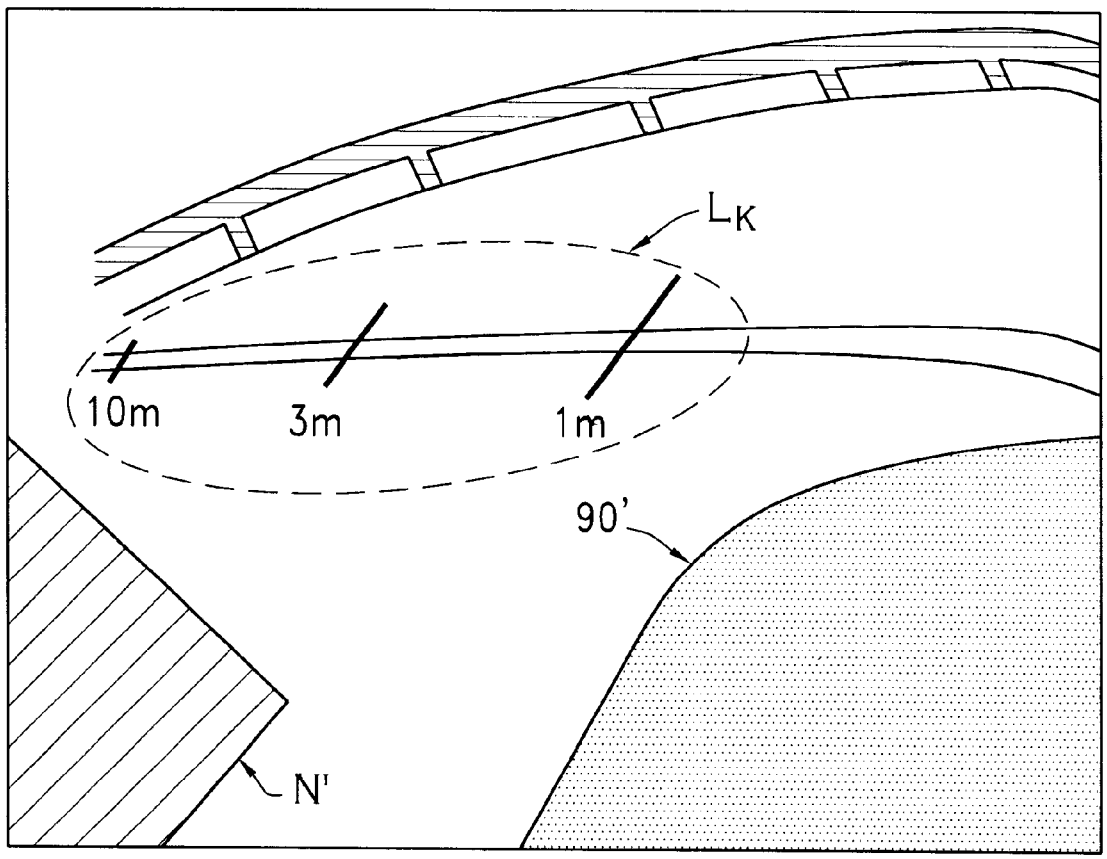
FIG. 31 shows a monitor display screen in blind cornering.

According to the display method for blind cornering, as shown in FIG. 31 (showing the picture $P_{PL}$ of the forward and leftward corners), the image of the blind spot is displayed, and the criterion distance scale on the ground from the vehicle is displayed as the distance line $L_K$ superimposed over that picture. The front right and the rear left/right sides are likewise displayed. In this case, the left and right pictures may be simultaneously displayed according to forward or reverse running, as shown as the pictures (1) and (2) in FIG. 32. For display of the left and right pictures simultaneously with transverse symmetry, the camera 21 (e.g., $C_{FR}$) on one of the left and right corners of the vehicle is disposed at a position with its optical axis within a vertical plane containing the straight line joining the driver and the camera 21, and the other camera 21 (e.g., $C_{FR}$) is disposed on the other of the left and right corners at a planarly symmetric position with respect to the center axis of the vehicle. An easier understanding can be achieved if the representation $M_I$ of the vehicle is superimposed over the center of the screen and orientated front to back.

Figure 32:
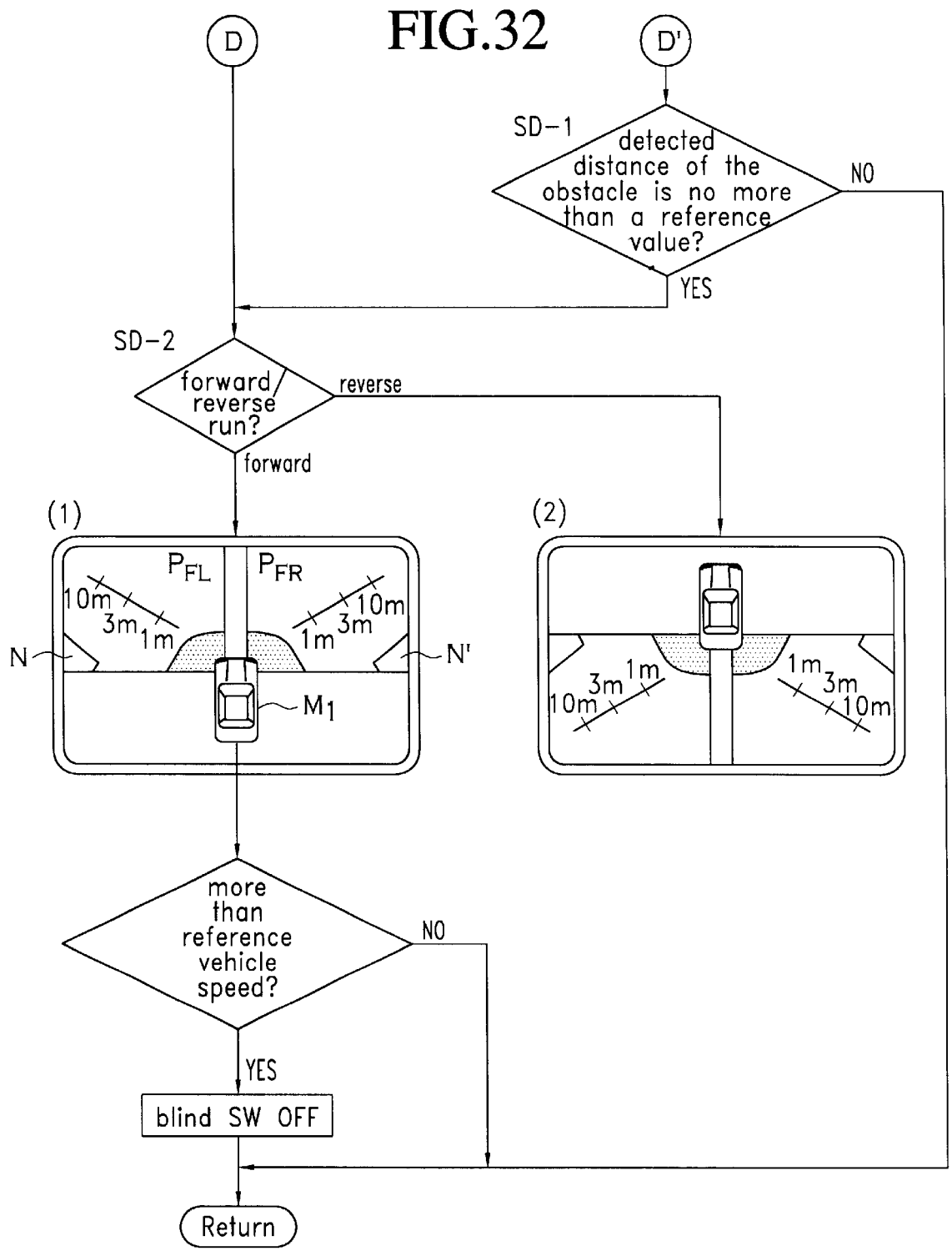
FIG. 32 is a flow chart of a routine for generating a blind cornering display.

The conditions for the display of this case follow the subroutine for the blind cornering display, illustrated by the flowchart of FIG. 32. This subroutine is executed only in low speed running, as has been described in connection with the aforementioned main routine. Moreover, the selection of the blind SW (for avoiding the obstacle), as shown in FIG. 2, is conditioned by the decision of Step S-3 shown in FIG. 14, and the one side screen shown in FIG. 31 or the screen (1) or (2) is displayed according to the forward/reverse running by the input decision of the position switch 23 of Step SD-2. In the case of the screen (1), the front left picture $P_{FL}$ and the front right picture $P_{FR}$ are properly arranged relative to the picture $M_I$ of the vehicle, and the distance index $L_K$ is superimposed, as shown in FIG. 31. This distance index $L_K$ also indicates the gazing direction of the driver, so that the orientation of the display is easily understood. Here, letter N' in FIG. 31 indicates an obstacle to the field of view.

Even if the blind SW is not selected as the decision in Step S-3, the drive is likewise assisted by displaying such pictures when entrance into an intersection having no signal is decided based on the navigation information in the database 4. In this case, the operation D' is executed, and a view is decided when it is decided at Step SD-1 that the distance detected by the obstacle sensor 28 is a reference value or less. The picture is then displayed according to the subroutine D.

The roads at an intersection are not always perpendicular, but frequently a road direction P will be oblique to the direction O of the vehicle, as shown in FIG. 33. In this case, an easier understanding can be provided by displaying the distance index $L_K$ according to the angle of intersection on each of the left and right pictures, as shown in FIG. 34. In the example shown, the display directions $\beta_L$ and $\beta_R$ of the distance index $L_{KB}$, in which the intersection angle is $\beta$, are shown in contrast to the single-dotted line $L_K$ indicating the distance index at the perpendicular intersection. This value is uniquely determined from the value $\beta$, as deduced from the navigation data, and from the images of the cameras 21 and their mounting on the vehicle body. The description of this case assumes that the intersecting roads are straight. If these roads are bent or folded, the display direction and the distance index $L_K$ are set according to the situation. If, in this case, the direction of the vehicle is accurately detected by a direction sensor 29 (as shown in FIG. 2), such as a gyro or compass mounted on the vehicle, the direction of the distance index $L_K$ can be accurately displayed in combination with the map data of the database (as shown in FIG. 2). With reference to this picture, the driver can drive the vehicle forward while confirming the safety on the left and right sides.

Back Dead Angle Confirmation

Figure 35:
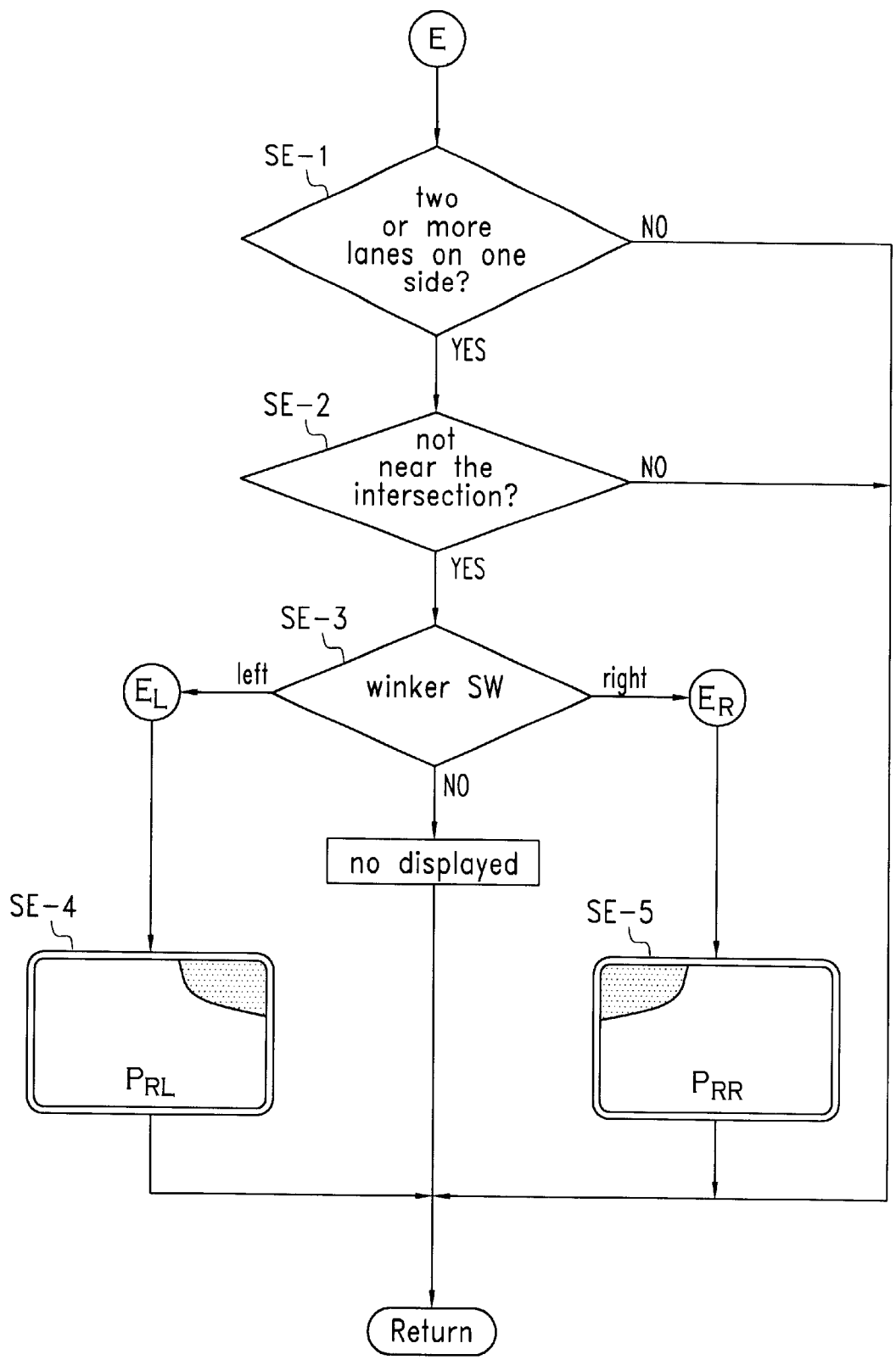
FIG. 35 is a flow chart of a routine for a rear dead angle display.

FIG. 35 shows a routine for display of the back dead angle areas. This display is executed by deciding a lane change when the vehicle speed is at least a predetermined value, when two or more lanes on one side are decided at Step SE-1 from the navigation information, when it is decided at Step SE-2 that the vehicle is not running near an intersection, and when the blinker operation is decided at Step SE-3, and the corresponding rear picture is displayed at Step SEA and Step SE-5. In connection with the lane change decision, the number of lanes of the traveled road and the lane in which the vehicle is running can be easily understood by using a white line detecting technique, as will be described hereinafter. Similar results can also be easily obtained by using the signal of an optical beacon which is disposed on the main roads. Even by using such information, the lane change can be easily decided in combination with the blinker operation. The accuracy is naturally enhanced by operation in combination with the navigation information.

White Line Confirmation

A major cause of making the white lines invisible at night and in raining weather is that the light of a vehicle running in the opposite direction is reflected by the water film H of the road surface G. In this case, the reflected light from the white line $W_{LL}$ reaches the eyes of the driver but is far weaker than that of the reflected light from the water film H so that its distinctive reflection is lost. Even under such circumstances, the white line $W_{LL}$ can be seen if near the vehicle. However, the light of the white line $W_{LL}$ near the vehicle is obstructed by the bonnet of the vehicle, and the view of the driver is apt to be forward, focused on the vehicles ahead or on the oncoming vehicles so that the white line $W_{LL}$ is not observed. The invention solves this problem by displaying the white line $W_{LL}$ near the vehicle to give the driver an image for recognizing the position of his/her vehicle in the lane followed.

Figure 36:
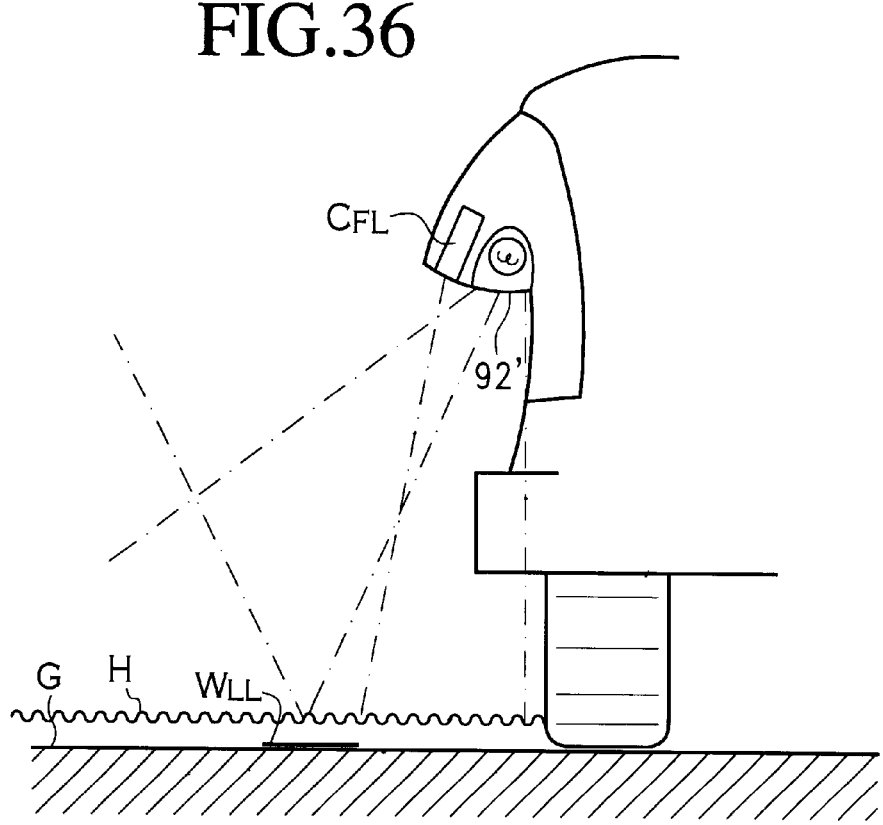
FIG. 36 is a sectional view schematically illustrating an additional unit arrangement for a white line display.

FIG. 36 schematically shows the arrangement of the image pickup unit for imaging the white line $W_{LL}$ on the near left side of the vehicle. In this case, the image pickup unit is exemplified by the camera $C_{FL}$ at the front left corner of the vehicle, as shown in FIG. 1. Moreover, a lamp 92' (or the side lamp 92 existing on the vehicle) is disposed on the front left corner of the vehicle for illuminating the ground in the left transverse direction and in the left front to illuminate the white line $W_{LL}$ so that it can be more clearly observed. Thus, the white line $W_{LL}$ can be observed without the driver being dazzled by the head lights of an oncoming vehicle.

Figure 37:
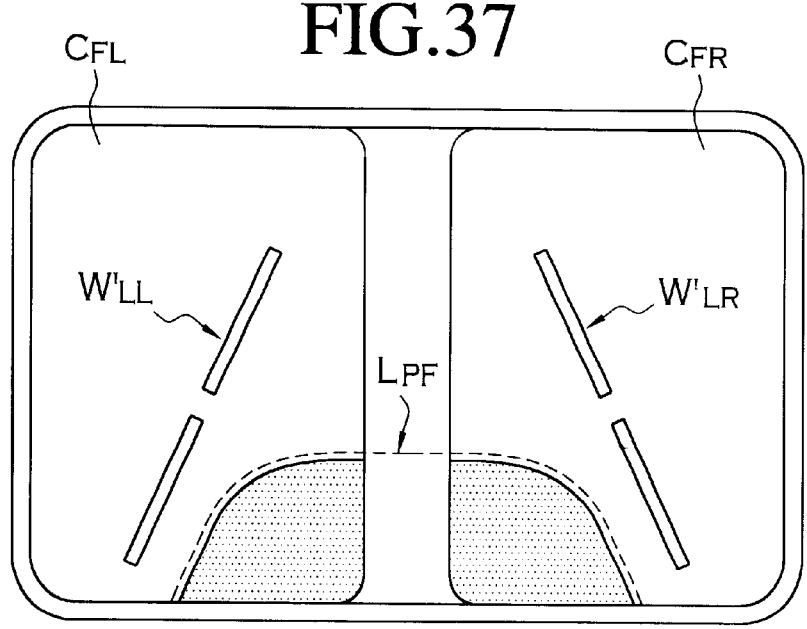
FIG. 37 illustrates a monitor display screen for the white line display.
Figure 38:
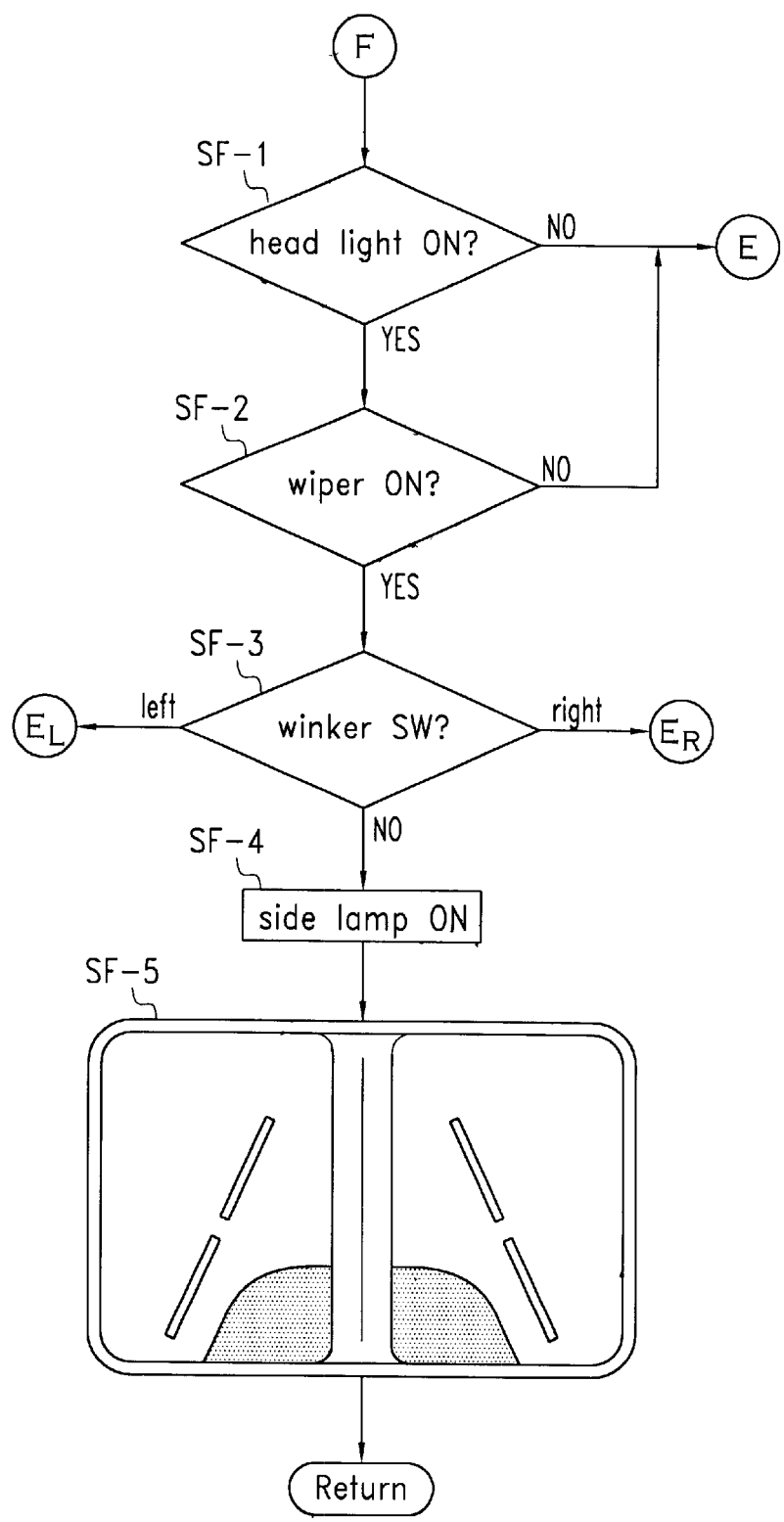
FIG. 38 is a flow chart of a routine for processing the white line display.

FIG. 38 shows a routine for imaging the white line. The conditions are satisfied when it is decided at Step SF-1 that the head light is turned ON at a predetermined or higher vehicle speed, and when it is decided at Step SF-2 that the wiper is activated at night and in raining weather. At Step SF-4, the side lamp is turned ON to illuminate the front road surface from the left side face. At Step SF-5, the screen of FIG. 37 is displayed. The routine skips back to provide an image of the back dead angle when NOT night or NOT raining weather. Even when the aforementioned two decisions are not satisfied, if the blinker is on, the decision for the back dead angle confirmation is skipped, and the back dead angle screen is displayed. On the other hand, such conditions need not be satisfied to turn ON the side lamp. The reason for this will now be described. Since the front left and right cameras $C_{FL}$ and $C_{FR}$ have largely different optical axes with respect to the direction of the head light of an oncoming vehicle or the like, the light of the oncoming vehicle neither enters the CCD of the camera nor dazzles the driver, even if the light of the oncoming vehicle makes a mirror reflection on water film. Since the reflected light from the white line is irregularly reflected, it can be sensed by the CCD. The side front of the vehicle can be sufficiently seen using the illumination of the oncoming vehicle, the following vehicle, the adjoining vehicle and the driven vehicle itself. Thus, the side lamp illuminating allows easier observation.

The display pictures present images from the front left corner camera $C_{FL}$ and the front right corner camera $C_{FR}$ on the common display, as shown in FIG. 37. The relationship between the left and right white lines $W'_{LL}$ and $W'_{LR}$ is so set to be identical to that which would be taken by a single camera, so that the driver has a realistic view. When the vehicle has a dark color, on the other hand, it is hard to view in the picture. Thus, discrimination between the vehicle and the road surface is facilitated if the contour $L_{FF}$ of the vehicle is superimposed.

White Line Detection

The driver assist system of this invention can also be used for detecting the white line. The specific method of detecting the white line is well known in the art so that its description will be omitted. According to most of the prior art methods, however, the camera is disposed in the vehicle compartment in the vicinity of the windshield. According to the present invention, on the other hand, the white line can be detected by using the two cameras which are disposed on the front left and right corners of the vehicle for detecting the dead angle, as has been described hereinbefore. Thus, by the detecting of the side white line in the vicinity of the vehicle by making use of the wide transverse field of view provided by the present invention, the relative position of the white line to the vehicle can be accurately detected. As has been described in connection with the display of the white line, moreover, there is achieved another advantage in that the white line can be detected, not only at night and in rainy weather, but also in foggy weather. Moreover, the system can be provided at a reasonable price because it also provides other functions.

In order to make the technical concept of the invention conveniently understood, the invention has been described on the basis of one embodiment together with modifications thereof. However, the invention is not limited to the described embodiment or modifications but can be practiced with a variety of modifications within the scope of the individual claims.

What is claimed is:

1. A driver assist system for mounting on a body of a vehicle and for providing a driver of the vehicle with a video camera image of an area in the vicinity of the vehicle body, said driver assist system comprising:

at least one image pickup unit mounted at the front or rear of the vehicle body and oriented with its optical axis vertically inclined relative to a reference orientation, so as to provide the video camera image simultaneously including a front or rear outermost edge portion of the vehicle and an area extending longitudinally from the vehicle, said reference orientation having the optical axis directed vertically downward and providing an image with an upper portion looking in a direction in line with forward travel of the vehicle; and a display unit for display of the video camera image to the driver.

2. A driver assist system as claimed in claim 1, wherein said image pickup unit is oriented with its optical axis substantially within a vertical plane containing a straight line of sight from the driver toward the image pickup unit.

3. A driver assist system as claimed in claim 1, wherein said video camera image extends through a vertical angle from a point on the ground vertically aligned with the one image pickup unit to infinity in line with forward travel of the vehicle, said image including a blind area of ground which is contiguous with the vehicle, which extends outward from the vehicle and which cannot be directly seen by the driver.

4. A driver assist system for mounting on a body of a vehicle and for providing a driver of the vehicle with a video camera image of an area in the vicinity of the vehicle body, said driver assist system comprising:

at least one image pickup unit mounted at the right or left of the vehicle body and oriented with its optical axis vertically inclined relative to a reference orientation, so as to provide the video camera image simultaneously including a left or right side outermost edge portion of the vehicle and an area extending transversely from the vehicle, said reference orientation having the optical axis directed vertically downward and providing an image with an upper portion being a view looking in a direction in line with forward travel of the vehicle; and a display unit for display of the video camera image to the driver.

5. A driver assist system as claimed in claim 4, wherein said image pickup unit is oriented with its optical axis substantially within a vertical plane containing a straight line of sight from the driver toward the image pickup unit.

6. A driver assist system as claimed in claim 4, wherein said video camera image extends through a vertical angle from a point on the ground vertically aligned with the one image pickup unit to infinity in line with forward travel of the vehicle, said image including a blind area of ground which is contiguous with the vehicle, which extends outward from the vehicle and which cannot be directly seen by the driver.

7. A driver assist system for mounting on a body of a vehicle and for providing a driver of the vehicle with a video camera image of an area in the vicinity of the vehicle body, said driver assist system comprising:
- at least one image pickup unit, mounted at a corner of the vehicle body and oriented with its optical axis vertically and transversely inclined relative to a reference orientation, so as to provide the video camera image simultaneously including an outermost corner edge portion of the vehicle and an area extending longitudinally and transversely from the vehicle, said reference orientation having the optical axis directed vertically downward and providing an image with an upper portion looking in a direction in line with forward travel of the vehicle; and
- a display unit for display of the video camera image to the driver.

8. A driver assist system as claimed in claim 7, wherein said image pickup unit is rotated on its optical axis so that the corner edge portion of the vehicle in the video camera image is in alignment with the corner on the opposite side of the vehicle.

9. A driver assist system as claimed in claim 7, wherein said image pickup unit is oriented with its optical axis substantially within a vertical plane containing a straight line of sight from the driver toward the image pickup unit.

10. A driver assist system as claimed in claim 9, wherein said image pickup unit is oriented with its optical axis substantially within a vertical plane containing a straight line of sight from the driver toward the image pickup unit.

11. A driver assist system as claimed in claim 7, wherein said video camera image extends through a vertical angle from a point on the ground vertically aligned with the one image pickup unit to infinity in line with forward travel of the vehicle, said image including a blind area of ground which is contiguous with the vehicle, which extends outward from the vehicle and which cannot be directly seen by the driver.

12. A driver assist system comprising an image pickup unit disposed on a vehicle for taking an image providing information on environment of the vehicle; a control unit for processing the image taken by said image pickup unit; and a monitor for displaying the picture processed by said control unit, wherein
- said image pickup unit is disposed over a corner of the vehicle with its optical axis directed to provide the image simultaneously including the corner of the vehicle, the environment at least in the vicinity of said corner and infinity as a single picture on one screen.

13. A driver assist system as claimed in claim 12, wherein said infinity is displayed across an entire transverse width of the monitor.

14. A driver assist system as claimed in claim 13, wherein said control unit includes predicted locus synthesizing means for superimposing a locus of predicted movement starting from the outermost corner edge of the vehicle, according to a steering angle, over the display of the processed picture on the monitor.

15. A driver assist system as claimed in claim 14, wherein said predicted locus is synthesized according to whether the transmission of the vehicle is in a forward range or a reverse range.

16. A driver assist system as claimed in claim 13, wherein said control unit includes display picture switching means for automatically switching the picture to be displayed on the monitor, by deciding the forward/reverse based on the selected range and by deciding necessity for switching based on at least one of the steering angle and road information obtained from a navigation system.

17. A driver assist system as claimed in claim 16, wherein said control unit includes release means for releasing the automatic display switching of the picture when lack of necessity is decided.

18. A driver assist system as claimed in claim 16, wherein said control unit includes warning means for notifying the driver that auxiliary information is available which is not contained in the information obtained from the picture displayed on the monitor.

19. A driver assist system as claimed in claim 13, wherein said control unit includes display picture selecting means for automatically displaying the pictures taken by the image pickup units, disposed at two opposing corners of the vehicle, responsive to a determination that a distance between an obstacle and one of the corners of the vehicle is no more than a predetermined value.

20. A driver assist system as claimed in claim 13, wherein said control unit includes criterion distance synthesizing means for superimposing a criterion distance line indicating spatial distance from the two vehicle corners in the picture displayed on the monitor.

21. A driver assist system as claimed in claim 13, wherein said control unit includes contour synthesizing means for superimposing a contour of the vehicle on the picture displayed on the monitor.

22. A driver assist system as claimed in claim 12, wherein said infinity extends across the front face of the vehicle, and said front face infinity is displayed over the corner of the vehicle on the monitor.

23. A driver assist system as claimed in claim 22, wherein said image pickup unit is oriented so that the front face infinity of the vehicle is horizontal in the display on the monitor.

24. A driver assist system as claimed in claim 12, wherein two of said image pickup units are disposed at transversely opposite positions on the vehicle with their optical axes inclined in transversely opposite directions with respect to the vehicle.

25. A driver assist system as claimed in claim 12, wherein said image pickup unit is oriented with its optical axis substantially within a vertical plane containing a straight line joining the driver and the image pickup unit.

26. A driver assist system as claimed in claim 12, wherein two of said image pickup units are respectively disposed at left and right corners of the vehicle.

27. A driver assist system as claimed in claim 26, wherein one of the image pickup units is oriented with its optical axis substantially within a vertical plane containing a straight line joining the driver and the image pickup unit, whereas a second image pickup unit is disposed and oriented symmetric with the one image pickup unit, relative to a longitudinal center axis of the vehicle.

28. A driver assist system as claimed in claim 12, wherein said video camera image extends through a vertical angle from a point on the ground vertically aligned with the one image pickup unit to infinity in line with forward travel of the vehicle, said image including a blind area of ground which is contiguous with the vehicle, which extends outward from the vehicle and which cannot be directly seen by the driver.

* * * * *

UNITED STATES PATENT AND TRADEMARK OFFICE
CERTIFICATE OF CORRECTION

PATENT NO.    : 6,476,731 B1
DATED         : November 5, 2002
INVENTOR(S)   : Miki et al.

It is certified that error appears in the above-identified patent and that said Letters Patent is hereby corrected as shown below:

<u>Title page,</u>
Item [30], Foreign Application Priority Data, insert:
-- Nov. 24, 1999  (JP)   11-333528 --.

Signed and Sealed this

Twentieth Day of May, 2003

JAMES E. ROGAN
*Director of the United States Patent and Trademark Office*